(12) United States Patent
Eck et al.

(10) Patent No.: US 10,122,670 B2
(45) Date of Patent: Nov. 6, 2018

(54) PROVIDING TRANSLATIONS OF ELECTRONIC MESSAGES VIA A SOCIAL NETWORKING SYSTEM

(71) Applicant: FACEBOOK, INC., Menlo Park, CA (US)

(72) Inventors: Matthias Eck, Mountain View, CA (US); Necip Fazil Ayan, Menlo Park, CA (US); Ying Zhang, Turlock, CA (US); Kay Rottman, San Francisco, CA (US); Lukasz Langa, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 454 days.

(21) Appl. No.: 14/588,078

(22) Filed: Dec. 31, 2014

(65) Prior Publication Data

US 2016/0191448 A1     Jun. 30, 2016

(51) Int. Cl.
*H04L 12/58* (2006.01)

(52) U.S. Cl.
CPC ............ *H04L 51/32* (2013.01); *H04L 51/063* (2013.01)

(58) Field of Classification Search
CPC .............................. H04L 51/32; H04L 51/063
USPC .......................................................... 709/206
See application file for complete search history.

(56) References Cited

U.S. PATENT DOCUMENTS

| | | | |
|---|---|---|---|
| 5,987,401 A * | 11/1999 | Trudeau | H04L 12/1827 704/2 |
| 8,331,550 B2 * | 11/2012 | Erhart | |
| 9,154,514 B1 * | 10/2015 | Prakash | H04L 63/1483 |
| 9,426,110 B2 * | 8/2016 | Aalbers | H04L 51/12 |
| 2006/0133585 A1 * | 6/2006 | Daigle | G06F 17/275 379/88.06 |
| 2008/0126077 A1 | 5/2008 | Thorn | |
| 2009/0198487 A1 | 8/2009 | Wong et al. | |
| 2011/0282645 A1 * | 11/2011 | Khuda | |
| 2012/0123837 A1 * | 5/2012 | Wiesner | G06Q 30/0214 705/14.16 |
| 2013/0006602 A1 | 1/2013 | Zhu et al. | |
| 2013/0282835 A1 | 10/2013 | Bates et al. | |

FOREIGN PATENT DOCUMENTS

| | | |
|---|---|---|
| KR | 10-2011-0133882 | 12/2011 |
| WO | WO 2016/108942 | 7/2016 |

OTHER PUBLICATIONS

International Search Report and Written Opinion as received in PCT/US2015/023143 dated Sep. 25, 2015.

* cited by examiner

*Primary Examiner* — David R Lazaro
*Assistant Examiner* — Berhanu Shitayewoldetadik
(74) *Attorney, Agent, or Firm* — Keller Jolley Preece

(57) ABSTRACT

The present disclosure is directed toward systems and methods for providing translations of electronic messages via a social networking system. For example, systems and methods described herein involve determining whether to provide an electronic message or a translation of the electronic message to a recipient based on social networking activities of the recipient. Furthermore, systems and methods described herein can provide a translation of an electronic message based on an analysis of social networking activities of one or more recipients of the electronic message.

20 Claims, 11 Drawing Sheets

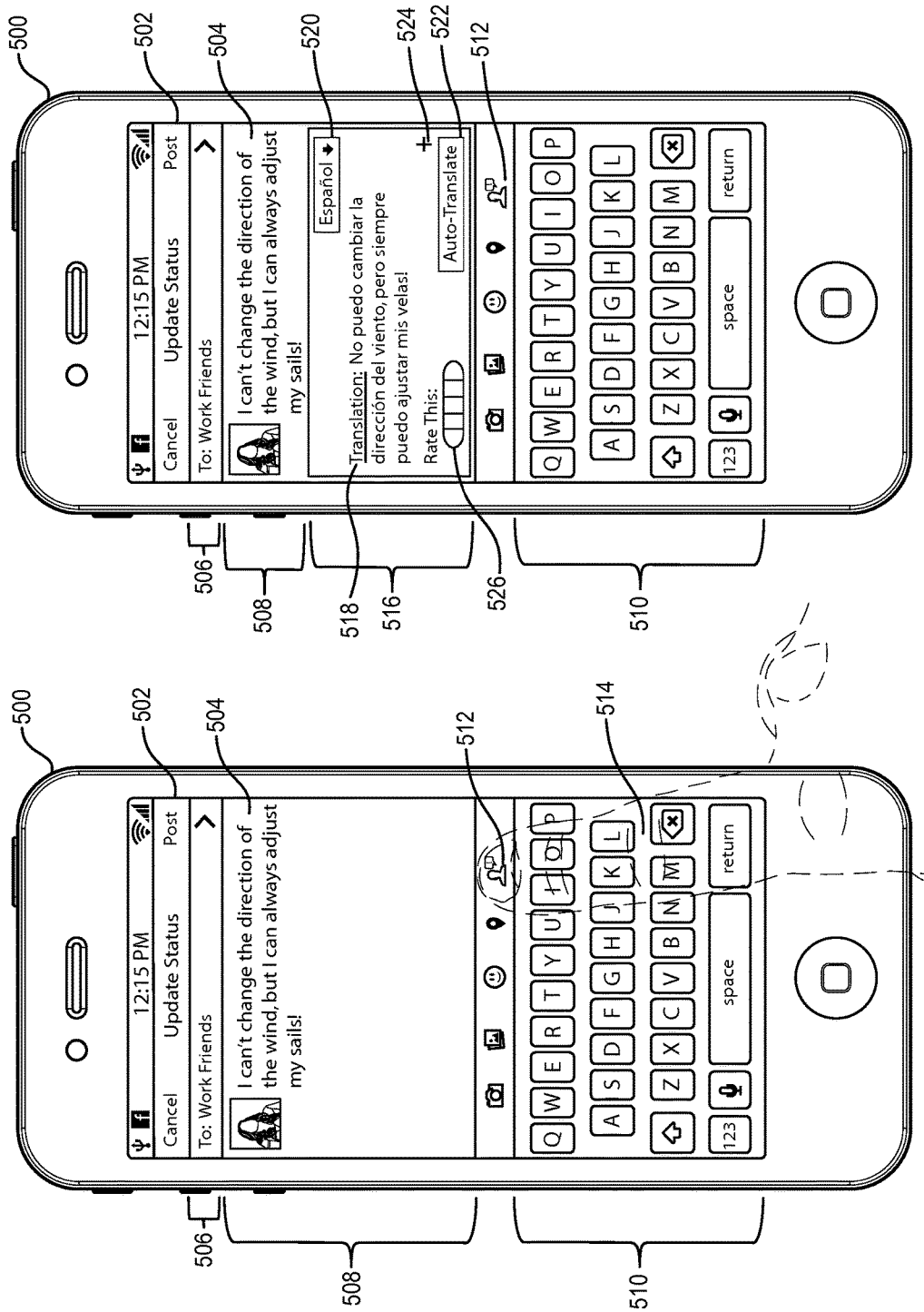

PROVIDING TRANSLATIONS OF ELECTRONIC MESSAGES VIA A SOCIAL NETWORKING SYSTEM

CROSS REFERENCE TO RELATED APPLICATIONS

N/A

BACKGROUND

1. Technical Field

One or more embodiments relate generally to a social networking system. More specifically, one or more embodiments relate to selectively providing translations of electronic message via a social networking system.

2. Background and Relevant Art

Social networking systems provide users with ways to communicate with each other across continents, cultures, and time zones. For example, a user in the United States can post an electronic message via a social networking system that a co-user can typically view in a different country within moments. Additionally, if the user is associated with multiple co-users via the social networking system across multiple locations, the user can post an electronic message that can be viewed simultaneously by all the associated co-users, regardless of where the associated co-users are located. Thus, a social networking system allows a user to easily communicate with multiple co-users globally with a minimal amount of effort.

Despite the ease of communication offered by social networking systems, a problem arises in the face of possible language barriers. For example, a message creator or sender may understand (e.g., read, write, and/or speak) multiple languages and be associated via a social networking system with co-users who are only monolingual. Thus, in order for an electronic message to be understood by all co-users associated with the message sender, the message sender generally has to translate the electronic message into various languages for display to all associated co-users, or post the electronic message in a single language to the detriment of associated co-users who may not understand that single language.

Thus, there are several disadvantages to current methods for providing translations of electronic messages via a social networking system.

SUMMARY

One or more embodiments described herein provide benefits and/or solve one or more of the foregoing or other problems in the art with systems and methods for providing translations of electronic messages via a social networking system. For example, one or more embodiments include systems and methods of providing translations of electronic messages to an electronic message recipient based on social networking activities performed by the message recipient as well as other information associated with the message recipient (e.g., profile information, etc.). In one or more embodiments, systems and methods described herein may receive an electronic message in a first language as well as a translation of the electronic message in a second language from a message sender. Following this, an embodiment can provide the electronic message or the translation of the electronic message (or both the original message and the translation if, for example, the recipient is bilingual) to a recipient, based on social networking activities performed by the message recipient that indicate one or more languages understood by (e.g., spoken by) the message recipient. Thus, systems and methods described herein can, in certain embodiments, provide the recipient with the electronic message in a language the message recipient most likely prefers without any extraneous information.

Furthermore, rather than receiving a translation of an electronic message from a message sender, one or more embodiments can automatically generate the translation of the electronic message. For example, one or more embodiments described herein can generate a translation based on social networking information and activities associated with the message sender and/or social networking activities of the message recipient that indicate one or more languages spoken by the message sender and the message recipient. For example, information and activities associated with a message sender or recipient can include electronic message interactions (e.g., comments, "likes," reposts, etc.), locations, check-ins, social network transactions, connections, profile information, preferences, translation ratings, and other implicit information collected on behalf of or provided by the message sender or recipient. In other words, when an explicit language preference is not available (or not reliable/trusted) for a recipient, the methods and systems disclosed herein derive implicit language preference information from the recipient's social networking activities and other information. Accordingly, systems and methods described herein can provide a translation of an electronic message to a message recipient even when the message sender does not understand the same language as the message recipient.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments of the invention will be described and explained with additional specificity and detail through the use of the accompanying drawings in which:

FIGS. 5A-5C illustrate user interfaces for performing an electronic message translation in accordance with one or more embodiments;

DETAILED DESCRIPTION

Figure 1:
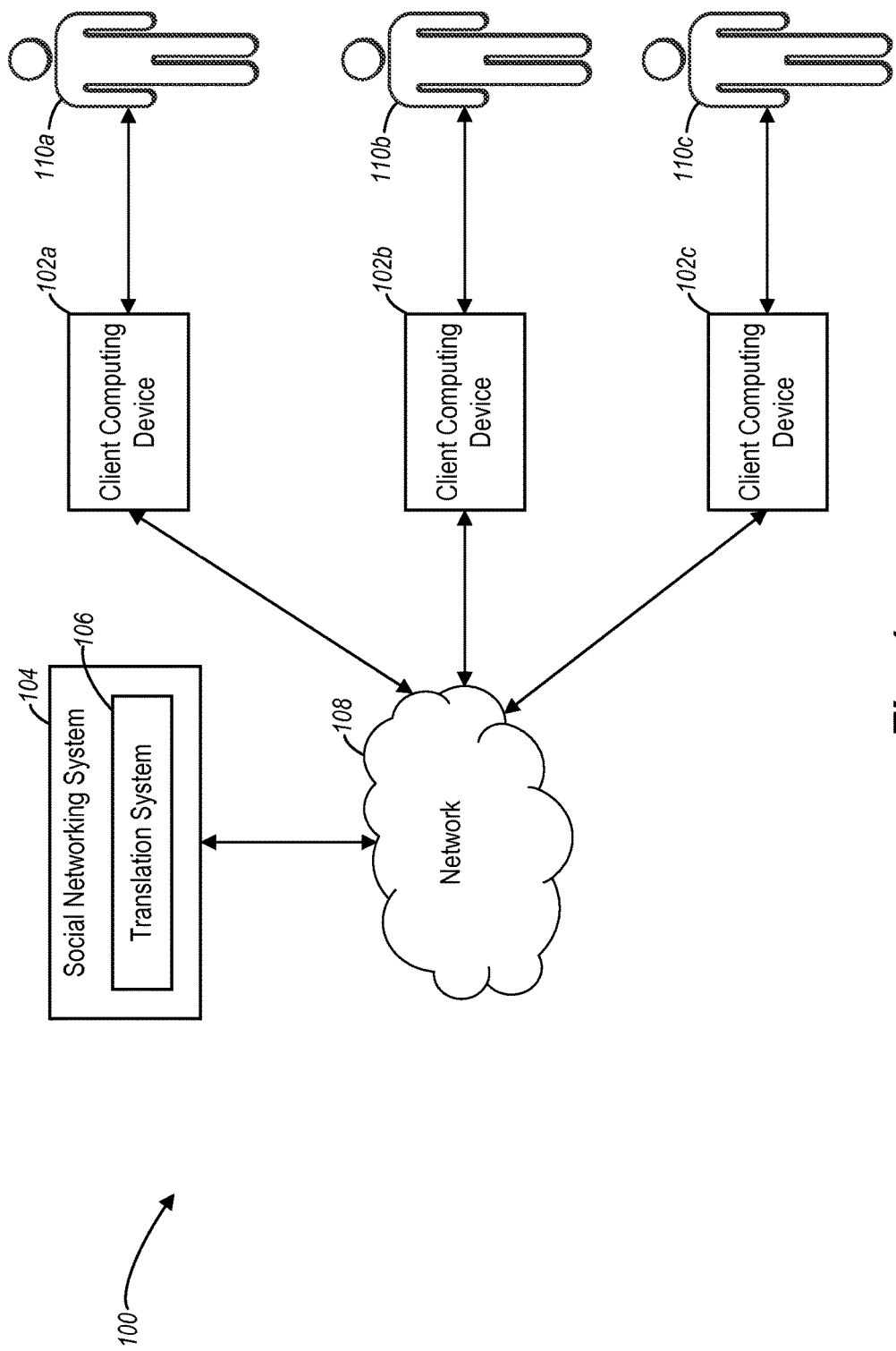
FIG. 1 illustrates a block diagram of an environment for implementing a translation system in accordance with one or more embodiments.

One or more embodiments described herein provide benefits and/or solve one or more of the foregoing or other problems in the art with systems and methods that provide users with translations of electronic messages via a social networking system. For example, a translation system of one or more embodiments provides translations of an electronic message to one or more recipients of the electronic message. In one or more embodiments, the translation system can receive both the electronic message and a translation of the electronic message from the message sender and determine which version of the electronic message to provide to a recipient associated with the sender via a social networking system. The translation system can make this determination based on a variety of factors that indicate a language understood by the recipient, including an analysis of the recipient's social networking information and/or activities.

Furthermore, in at least one embodiment, rather than receiving both the electronic message and the translation of the electronic message from the message sender, the translation system can automatically generate the translation of an electronic message received from a message sender. For example, the translation system can receive an electronic message from a message sender and can generate a translation of the electronic message without any further input from the sender. In an alternative embodiment, the sender can further edit the auto-generated translation (e.g., the sender can fix one or more translation errors and/or include certain informalities in order to make the translation more authentic to the sender's style). The translation system can then determine whether to send the electronic message or the translation of the electronic message (or both the electronic message and the translation of the electronic message) to a recipient associated with the message sender via a social networking system. In one or more embodiments, the translation system can generate the translation of the electronic message in one or more languages based on social networking activities and/or information associated with the message sender and/or the message recipient (e.g., electronic message interactions, provided translations, connections, social networking system transactions, etc.).

In order to determine whether a translation of an electronic message should be generated by the translation system, one or more embodiments described herein can analyze information related to a message sender and a message recipient to identify one or more languages understood by the message sender and the message recipient. For example, an embodiment can analyze information including one or more of profile information, social networking activity information, social networking connections, and translation rating information associated with the message sender in order to determine one or more languages understood by (or preferred by) the message sender. For example, translation rating information associated with the message sender can be associated with translations and/or translation ratings the message sender has provided for messages sent by the message sender, or alternatively, may be associated with translations and/or translation ratings the message sender has provided for messages sent by others. Additionally, an embodiment can perform the same or similar analysis based on information associated with the message recipient, including one or more of profile information, social networking activity information, social networking connections, and translation rating information, to determine one or more languages understood by the message recipient. By determining one or more languages understood by the message sender and the message recipient, an embodiment described herein can do one or more of the following: prompt a message sender for a translation of the electronic message, auto-generate a translation of the electronic message if one is not provided by the message sender, determine whether a translation provided by the message sender is likely accurate, determine whether the message recipient understands the same language as that represented in the translation, determine whether the message recipient would likely prefer the translation of the electronic message rather than the electronic message itself, and determine whether the message recipient would likely prefer a different translation of the electronic message.

Additionally, an embodiment can analyze this same information to determine whether a translation of the electronic message is necessary, where the message sender does not provide a translation of the electronic message. For example, an embodiment described herein can identify potential recipients of the sender's electronic message, and can determine whether those potential recipients understand the same language in which the electronic message is written. If the potential recipients do not understand the language of the electronic message, one embodiment can determine the one or more languages spoken by the potential recipients, and provide a translation of the electronic message for each of the one or more languages, with no further input from the message sender. Alternatively, if the message sender has reliably provided translations in an appropriate language for the message recipient, an embodiment can prompt the message sender for the translation or for edits to an auto-generated translation. Thus, by analyzing information associated with a message sender, systems and methods described herein can reliably determine how to provide an electronic message to an intended recipient such that the recipient can easily understand the electronic message, regardless of which language the message sender prefers.

Furthermore, it is possible that a message sender is associated with a group of message recipients who understand a variety of languages. In one or more embodiments, the methods and systems described herein can determine which translation of a group of electronic message translations (either provided by the message sender and/or auto-generated by the system) to send to each intended message recipient. For example, one embodiment can analyze information associated with each intended message recipient in order to determine a language understood by the intended message recipient. The information analyzed by one or more embodiments can include profile information associated with the recipient, social networking activity information associated with the recipient, translation rating information associated with the recipient, as well as other information associated with the recipient. Accordingly, by providing the ability to provide the most relevant translation of an electronic message to each intended recipient, one or more embodiments described herein ensure that each recipient intended by the message sender easily understands the electronic message. One or more embodiments provide this benefit, even when the message sender is incapable of providing the needed translations, or provides translations that are poor in quality.

As used herein, the term "social networking system" refers to a system that supports or enables on-line communication, input, interaction, content-sharing, and collaboration between users. A user of the social networking system can have one or more "friends" via the social networking system. As used herein, the term "friend" refers to a co-user associated with a user via the social networking system (i.e., a contact or connection).

In one or more embodiments, a user may send one or more electronic messages via the social networking system. As used herein an "electronic message" refers to an electronic communication sent from one user to one or more co-users associated with the user via the social networking system. An electronic message can be a private message between only a sender and one recipient. Alternatively, an electronic message can be a semi-public message (e.g., a "post," "comment," tag, etc.) between a sender and a group of recipients. Additionally, an electronic message can include multimedia, location check-ins, user tags, other types of information, and/or any other suitable content or data provided to social networking users.

FIG. 1 illustrates an example schematic diagram of a translating system 100 (or simply "system 100"). As illustrated in FIG. 1, the system 100 may include client computing devices 102a, 102b, and 102c, and a social networking system 104, which are communicatively coupled through a network 108. Additionally, the social networking system 104 may also include a translation system 106, which will be described in greater detail below with reference to FIG. 2. As further illustrated in FIG. 1, users 110a, 110b, 110c may interact with client computing devices 102a-102c respectively to access content and/or services on the social networking system 104.

The client computing devices 102a-102c and the social networking system 104 can communicate via the network 108, which may include one or more networks and may use one or more communication platforms or technologies suitable for transmitting data and/or communication signals. In one or more embodiments, the network 108 may include the Internet or World Wide Web. The network 108, however, can include various other types of networks that use various communication technologies and protocols, such as a corporate intranet, a virtual private network (VPN), a local area network (LAN), a wireless local network (WLAN), a cellular network, a wide area network (WAN), a metropolitan area network (MAN), or a combination of two or more such networks. Although FIG. 1 illustrates a particular arrangement of the client computing devices 102a-102c, the social networking system 104, and the network 108, various additional arrangements are possible. For example, the client computing devices 102a-102c may directly communicate with the social networking system 104, bypassing the network 108. Additional details relating to the network 108 are explained below with reference to FIG. 9.

As illustrated in FIG. 1, the system 100 can include the users 110a-110c. As described above, the users 110a-110c may be individuals (i.e., human users), businesses, groups, or other entities. Although FIG. 1 illustrate three users 110a-110c, it is understood that the system 100 can include a plurality of users, with each of the plurality of users interacting with the system 100 through a corresponding plurality of client computing devices.

With reference to the system 100 described herein, if the users 110a-110c are social networking system friends, any of the users 110a-110c may be a sender of an electronic message, and any of the users 110a-110c may be a recipient of an electronic message. For example, in one embodiment, the user 110a may be an electronic message sender, and user 110b may be the recipient of the electronic message sent by the user 110a. Alternatively, in another embodiment, the user 110a may send an electronic message without any specific intended recipient. In that case, all users associated with the user 110a via the social networking system (i.e., the users 110b and 110c) will become recipients of the electronic message sent by the user 110a.

The client computing devices 102a-102c may include various types of computing devices. For example, the client computing device 102a-102c can include a mobile device such as a mobile telephone, a smartphone, a PDA, a tablet, a laptop or a non-mobile device such as a desktop, a server, or another type of computing device. Further, the client computing devices 102a-102c may run dedicated mobile social networking applications associated with the system 100 and/or utilize one or more browser applications to access social networking content (e.g., electronic messages, webpages, profiles, etc.) associated with the system 100. In turn, the system 100 may present information and content to the users 110a-110c by way of one or more social networking pages (e.g., web pages or pages/views of a mobile application). Additional details with respect to the client computing devices 102a-102c are discussed below with respect to FIG. 8.

In addition, and as shown in FIG. 1, the system 100 can include the social networking system 104. One or more computing devices executing instructions to perform the processes and provide the features disclosed herein may implement the social networking system 104. For example, one or more server devices may implement the social networking system 104. Additionally, in some embodiments, the social networking system 104 may be partially implemented by one or more of the client computing devices 102a-102c.

The client computing devices 102a-102c of FIG. 1 can also send and receive electronic messages by way of the social networking system 104. For example, a social networking application operating on each of the client computing devices 102a-102c may communicate with the social networking system 104. In one or more embodiments, the social networking application can receive inputs from a user via any of the client computing devices 102a-102c (e.g., such as by way of a touch screen of a client computing device) representative of text, or other types of media, for use in an electronic message.

The social networking system 104 can post electronic messages (whether text or otherwise) to a social networking graphical user interface (e.g., a profile, a newsfeed, or "wall") of one or more users of the social networking system 104. For example, one or more embodiments may present a user 102a, 102b, or 102c with a social networking system newsfeed including electronic messages from one or more co-users associated with the user 102a, 102b, or 102c via the social networking system 104. In one or more embodiments, each user 102a, 102b, or 102c may scroll through the social networking system newsfeed in order to view recent electronic messages submitted by the one or more co-users associated with the user 102a, 102b, or 102c via the social networking system 104. In one embodiment, the system 100 may organize the electronic messages chronologically in a user's social networking system newsfeed. In alternative embodiments, the system 100 may organize the electronic messages geographically, by interest groups, according to a relationship coefficient between the user and the co-user, etc. Additionally, in one or more embodiments, the user 102a, 102b, or 102c may download a copy of the social networking system newsfeed as a record of the electronic messages displayed thereon.

Additionally, in one embodiment, the social networking system 104 can transmit electronic messages between the users 102a, 102b, and 102c. For example, in response to the user 102a submitting an electronic message to the social networking system 104, the social networking system 104 can update the social networking system newsfeeds of the users 102b and 102c to include the electronic message submitted by the user 102a. Furthermore, in one embodiment, the social networking system 104 can transmit an electronic message between just two of the users 102a, 102b, or 102c, such that the social networking system 104 does not add the electronic message to the social networking newsfeed of a plurality of co-users. In other words, an electronic message can be a private message between two users of the social networking system 104, or it may be a semi-public message that the social networking system 104 adds to the social networking system newsfeeds of a plurality of co-users of the social networking system 104.

As shown in FIG. 1, the social networking system 104 can also include the translation system 106. As with the social networking system 104, in one embodiment the translation system 106 is wholly operated on a server (i.e., the social networking system 104) communicatively coupled with one or more client computing devices. In one or more alternative embodiments, the client computing devices 102a-102c can operate the translation system 106. In yet other alternative embodiments, the translation system 106 can be partially operated on a server and partially operated on one or more client computing devices. The translation system 106 will be described in greater detail with reference to FIG. 2.

Figure 2:
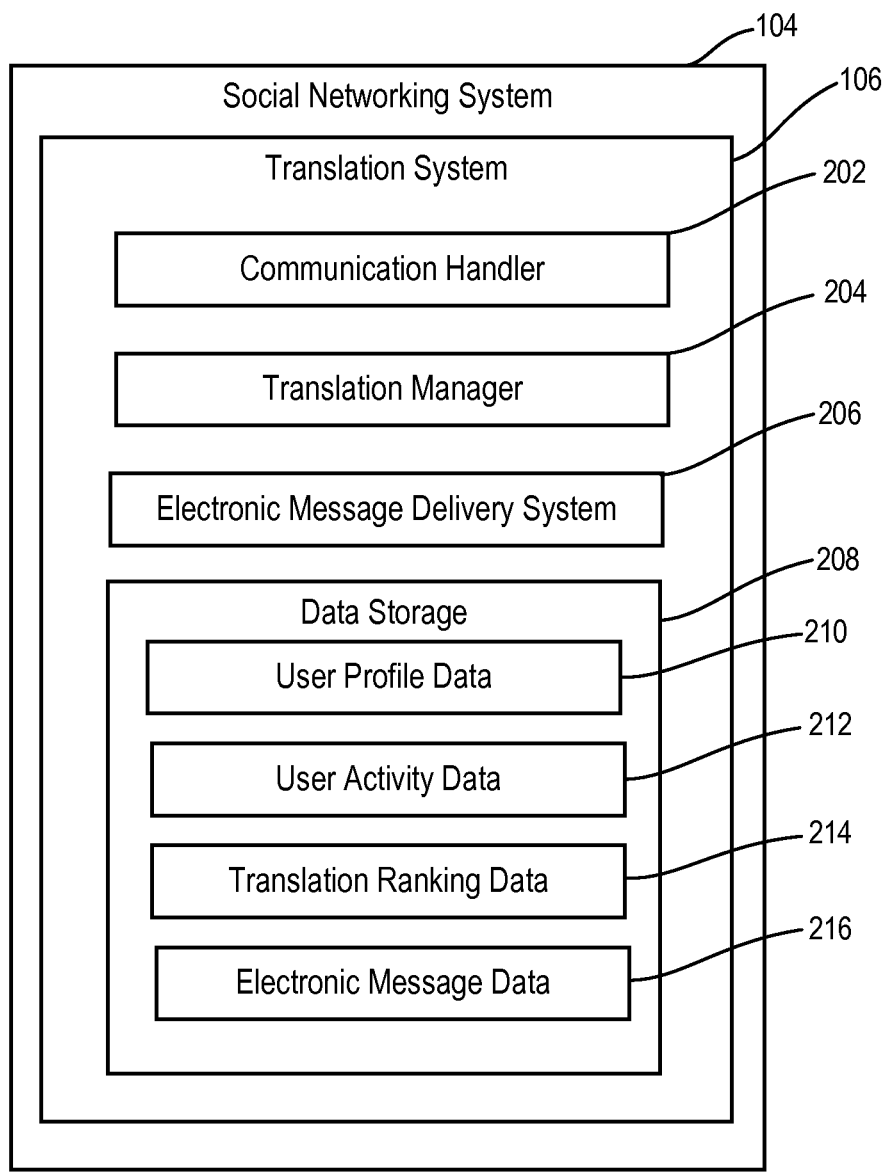
FIG. 2 illustrates a detailed schematic diagram of a translation system in accordance with one or more embodiments.

FIG. 2 illustrates a schematic diagram illustrating an example embodiment of the translation system 106. As shown, the translation system 106 can include various components for performing the processes and features described herein. For example, as shown in FIG. 2, the translation system 106 may include, but is not limited to, a communication handler 202, a translation manager 204, an electronic message delivery manager 206, and a data storage 208. The data storage 208 can store user profile data 210, user social networking activity data 212, translation rating data 214, and electronic message data 216. Although the disclosure herein describes the components 202-216 to be separate, as illustrated in FIG. 2, any of the components 202-216 may be combined into fewer components, such as into a single facility or module, or divided into more components as may serve one or more embodiments.

Each of the components 202-216 of the translation system 106 can be implemented using a computing device including at least one processor executing instructions that cause the translation system 106 to perform the processes described herein. In some embodiments, the components 202-216 of the translation system 106 can all be implemented by a single server device, or across multiple server devices. Additionally or alternatively, a combination of one or more server devices and one or more client devices can implement the components 202-216 of the translation system 106. Furthermore, in one embodiment, the components 202-216 can comprise hardware, such as a special-purpose processing device to perform a certain function. Additionally or alternatively, the components 202-216 can comprise a combination of computer-executable instructions and hardware.

As mentioned above, the translation system 106 can include a communication handler 202. In one or more embodiments, the communication handler 202 can communicate with the social networking system 104 to receive electronic messages. As described above, the users 110a-110c may send electronic messages via the social networking system 104. Accordingly, in one embodiment, when the social networking system 104 receives an electronic message from one of the users 110a-110c, the social networking system 104 can provide the electronic message to the translation system 106 via the communication handler 202. For example, in one embodiment, the communication handler 202 may receive an electronic message composed by one of the users 110a-110c and sent via one of the client computing devices 102a-102c to another one of the users 110a-110c by way of the social networking system 104.

Additionally, the communication handler 202 can also send electronic messages. For example, in one embodiment, the translation system 106 may determine to provide an electronic message recipient with a translation of an electronic message. In that case, the communication handler 202 can send the translation of the electronic message to the recipient via the social networking system 104. Furthermore, in another embodiment, the translation system 106 may determine to provide an electronic message recipient with an original electronic message from a message sender, rather than sending a translation of the electronic message. In that case, the communication handler 202 can forward the original electronic message from the message sender to the intended recipient without any further intervention by the translation system 106.

In addition to sending and receiving electronic messages, the communication handler 202 can also communicate with the social networking system 104 to receive various types of user information useful in providing translations. For example, the communication handler 202 can communicate with the social networking system 104 in order to receive user profile information. In one or more embodiments, user profile information can include, but is not limited to, personal information about a user (e.g., name, gender, age, birth date, hometown, etc.), contact information (e.g., residence address, mailing address, current city, email addresses, phone numbers, screen names, etc.), education information (e.g., schools attended, degrees obtained, time periods associated with educational institutions, graduation year(s), area(s) of study, etc.), employment information (e.g., employer, position, employer location(s), employment history, time periods associated with past employers, salary range, etc.), family and relationship information (e.g., married to, engaged to, partners with, parents of, siblings of, children of, cousin of, relationship with, etc.), and any other type of personal information related to a user. It will be understood that for the purposes of the translation system 106, the user can be either an electronic message sender, or an electronic message recipient.

The communication handler 202 can also communicate with the social networking system 104 in order to receive social networking activity information associated with a user. As mentioned above, the translation system 106 can utilize social networking activity information in order to determine whether to send an electronic message to a recipient, or to send a translation of an electronic message to the recipient. In one or more embodiments, social networking activity information can include, but is not limited to, user actions (e.g., likes, page visits, games, clicks, groups, interest lists, etc.), electronic message interactions (e.g., electronic messages submitted, electronic messages read, comments made, electronic messages "liked," etc.), social connections (e.g., "friends," groups, following, members of, connections, communications, private messages, etc.), tags (e.g., tags directed toward the user in photos, videos, electronic messages, etc.), check-ins or other location information (e.g., indications of a current location associated with the user, a location where the user came from, a location where the user has traveled to, a location where the user works, one or more locations where the user has lived, or a location associated with where the user was educated, etc.), and social network transactions (e.g., a purchase made by the user via a social networking system, a purchase made by the user announced via the social networking system, a currency associated with a purchase made by the user via the social networking system, a product recommended by the user via the social networking system, or a point of origin for a product purchased by the user via the social networking system, etc.).

Additionally, the communication handler 202 can also communicate with the social networking system 104 in order to receive translation rating information. In one or more embodiments, the translation system 106 can allow any of the users 110a-110c to rate a translation of an electronic message. For example, the translation rating reflects how accurate one or more recipients of an electronic message have found the translation of the electronic message. The translation rating can take into account the language competencies of recipients who contributed to the rating (i.e., based on social networking activities of the recipients), as well as an evaluation of the trustworthiness of the recipients as translators (i.e., based on how well one recipient's translation ratings stay in-line with other recipients' translation ratings). Accordingly, an electronic message may be associated with a translation rating that reflects multiple ratings submitted by many recipients (i.e., the translation rating can be "crowd-sourced").

In one or more embodiments, the translation rating can also reflect a rating submitted by the sender of an electronic message. For example, the sender may provide a translation of an electronic message along with the electronic message. In that case, the sender may rate the translation in order to indicate whether the sender believes the translation is poor, average, above-average, etc. It is possible that the sender may provide a poor rating for a translation because the sender purposefully used slang terms in the translation. Additionally, it is possible that the sender may provide an above-average rating for a translation when the sender utilizes formal grammar in the translation. Accordingly, regardless of the translation rating associated with an electronic message, the communication handler 202 can receive translation rating information associated with an electronic message.

In addition to communicating with the social networking system 104 in order to receive user information, the communication handler 202 can also identify potential recipients of an electronic message. For example, in some embodiments, an electronic message sender may not indicate a specific recipient for an electronic message (e.g., as is the case when the message sender posts an electronic message to the social network system co-users associated with the sender via the social networking system 104). Additionally, in some embodiments, the translation system 106 may provide a translation of a received electronic message. In that case, the translation system 106 can determine the language in which to provide the translation of the electronic message based on an analysis of potential recipients of the electronic message. Accordingly, in either situation, the communication handler 202 may identify potential recipients to whom the translation system 106 can provide the electronic message or a translation of the electronic message.

The communication handler 202 can identify potential recipients of an electronic message in order to assist the translation system 106 in determining a language in which to base a translation. In one embodiment, the sender of the electronic message may provide an indication of one or more intended recipients of the electronic message. In that case, the communication handler 202 can simply identify the one or more intended recipients of the electronic message with no further analysis.

In another case, however, the sender of the electronic message may submit the electronic message to the social networking system 104 with no specific recipient indication, but rather for display to all co-users associated with the sender. In that embodiment, in order to provide a relevant translation of the electronic message, the communication handler 202 can identify one or more potential electronic message recipients by communicating with the social networking system 104 to receive user profile information and user social networking activity information associated with the sender. In one embodiment, the communication handler 202 can analyze the message sender's social connections (e.g., "friends," groups, following, members of, connections, communications, private messages, etc.) in order to identify one or more potential recipients of the electronic message.

In some cases, the communication handler 202 can also weight the identified potential electronic message recipients based on a relationship coefficient between each identified potential electronic message recipient and the sender. For example, in some embodiments, the sender of an electronic message may have a high relationship coefficient with only a few of the one or more potential electronic message recipients identified by the communication handler. The communication handler 202 may identify a high relationship coefficient between the sender and a recipient based on a high level of interaction between the sender and the recipient (e.g., the sender and the recipient have been social networking friends for a long time, the sender is tagged in the recipients photos and vice versa, the sender sends private messages to the recipient and vice versa, the sender posts electronic messages to the recipient and vice versa, the sender checks in at locations where the recipient is or has checked in at and vice versa, the sender interacts with social networking content posted by the recipient and vice versa, etc.). Accordingly, in one or more embodiments, when determining a language into which an electronic message should be translated, the translation system 106 may base the translation on a language spoken by a potential electronic message recipient who has a high relationship coefficient with the electronic message sender. In additional or alternative embodiments, the translation system 106 may provide multiple translations of an electronic message based on languages spoken by all potential recipients who have a relationship coefficient with the electronic message sender that is within a predetermined threshold.

As mentioned above, and as illustrated in FIG. 2, the translation system 106 can also include a translation manager 204. The translation manager 204 can receive one or more translations, and identify a language of a received translation. As discussed above, in some embodiments, an electronic message sender may provide the original electronic message and a translation of the electronic message. In that case, the translation manager 204 can receive the translation of the electronic message, and can determine the language of the received translation. For example, the translation manager 204 can determine a language of a received translation utilizing natural language processing, grammars, databases, web look-ups, or any other technique for determining a language of a translation. Alternatively, the sender can indicate the language of the translation provided by the sender.

The translation manager 204 can also identify a translation language associated with one or more potential electronic message recipients. As described above, when an electronic message sender does not explicitly indicate a recipient of the electronic message, the communication handler 202 can identify one or more potential electronic message recipients. The one or more potential electronic message recipients, however, may understand a variety of languages. Thus, in order for the translation system 106 to provide a relevant translation of the electronic message, the translation manager 204 can identify one or more translation languages associated with the one or more identified potential electronic message recipients.

In one or more embodiments, the translation manager 204 can identify one or more translation languages associated with an identified potential electronic message recipient by performing a language analysis on the user information associated with the identified recipient. As discussed above, the translation system 106 can receive user profile information, user social networking activity information, and translation rating information via the communication handler 202. In one embodiment, the translation manager 204 can analyze this information in order to identify one or more languages associated with the potential electronic message recipient. For example, the translation manager 204 can identify one or more languages associated with the potential electronic message recipient based on the recipient's profile information (e.g., places where the recipient lives or has lived can be indicative of a language spoken by the recipient, etc.), on the recipient's social networking activity (e.g., electronic messages and comments posted by the recipient can be indicative of a language spoken by the recipient, page likes can be indicative of a language spoken by the recipient, location check-ins can be indicative of a language spoken by the recipient, employment history can be indicative of a language spoken by the recipient, etc.), and on the recipient's translation rating information (e.g., translation ratings submitted by the recipient that are consistent with other user's translation ratings can be indicative of a language spoken by the recipient, etc.). The translation manager 204 can determine a language associated with a potential electronic message recipient by utilizing natural language processing, grammars, databases, web look-ups, etc.

Once the translation manager 204 has identified one or more translation languages associated with identified potential electronic message recipient(s), the translation manager 204 can also generate a translation of an electronic message into the identified translation language(s). For example, utilizing natural language processing, grammars, databases, web look-ups, etc., the translation manager 204 can generate a translation of an electronic message that will likely be relevant to the identified one or more potential electronic message recipients. In other words, if a sender provides an electronic message in a first language, but the translation manager 204 has identified a second language associated with one or more potential recipients of the electronic message, the translation manager 204 can generate a translation of the electronic message in the second language. In additional or alternative embodiments, the translation manager 204 can generate a plurality of translations of the electronic message if the translation manager 204 identifies a plurality of languages associated with the one or more potential recipients of the electronic message.

As mentioned above, and as illustrated in FIG. 2, the translation system 106 can also include an electronic message delivery manager 206. The electronic message delivery manager 206 can analyze information associated with an electronic message recipient, and based on the analysis can determine whether to provide an electronic message or a translation of the electronic message to the recipient. As described above, the translation system 106 can receive an electronic message from a sender. In one or more embodiments, the sender may also provide a translation of the electronic message, or the translation manager 204 can generate a machine translation of the electronic message. In order for the translation system 106 to provide an electronic message to a recipient in a language that the recipient will most likely prefer, the electronic message delivery manager 206 can first perform a language analysis of the information associated with the recipient in order to determine a predominant language associated with the recipient.

As discussed above, the translation manager 204 may perform a language analysis of one or more potential recipients of an electronic message in order to determine at least one additional language in which to provide a translation of the electronic message. In some embodiments, however, it is possible that a potential recipient prefers a particular language even though the potential recipient understands multiple languages. In other words, in one example, the translation manager 204 may provide a Spanish translation of an English electronic message after identifying a potential recipient who understands both Spanish and English. In the same example, the electronic message delivery system 206 may perform a language analysis that determines that English is the predominant language of the potential recipient, even though the potential recipient also understands Spanish.

The language analysis performed by the electronic message delivery system 206 of the information associated with the electronic message recipient can take into account user profile information associated with the recipient, user social networking activity information associated with the recipient, and translation rating information associated with the recipient. For example, the electronic message delivery manager 206 can analyze user profile information associated with the recipient to determine whether to send the recipient the electronic message or the translation of the electronic message. In one embodiment, the electronic message delivery manager 206 can analyze user profile information such as, but not limited to, personal information associated with the recipient (e.g., a recipient's hometown can be indicative of a language spoken by the recipient), contact information associated with the recipient (e.g., a recipient's residence, mailing address, and/or current city can be indicative of a language spoken by the recipient), education information associated with the recipient (e.g., a recipient's alma mater(s), degrees, and area(s) of study can be indicative of a language spoken by the recipient), employment information associated with the recipient (e.g., a recipient's employment history, current employer, employer location(s) can be indicative of a language spoken by the recipient), and family and relationship information associated with the recipient (e.g., who the recipient is married to, is engaged to, is partners with, is a parent of, is a sibling of, is a child of, is in a relationship with, etc. can be indicative of a language spoken by the recipient).

The electronic message delivery manager 206 can also analyze user social networking activity information associated with the recipient to determine whether to send the recipient the electronic message or the translation of the electronic message. In one embodiment, the electronic message delivery manager 206 can analyze user social networking activity information such as, but not limited to, user actions associated with the recipient (e.g., pages liked by the recipient can be indicative of a language spoken by the recipient, pages visited by the recipient can be indicative of a language spoken by the recipient, the languages used in electronic messages sent by the recipient can be indicative of a language spoken by the recipient, the languages used in electronic messages read by the recipient can be indicative of a language spoken by the recipient, comments made by the recipient can be indicative of a language spoken by the recipient, etc.), social connections associated with the recipient (e.g., friends, groups, connections, communications, private messages, etc. can be indicative of a language spoken by the recipient), check-ins associated with the recipient (e.g., locations where the recipient has checked-in can be indicative of a language spoken by the recipient), and purchases associated with the recipient (e.g., a currency associated with a recipient's purchase can be indicative of a language spoken by the recipient, etc.).

Additionally, the electronic message delivery manager 206 can analyze translation rating information associated with the recipient to determine whether to send the recipient the original version of the electronic message or a translated version of the electronic message. In one embodiment, the electronic message delivery manager 206 can analyze a number of translation ratings associated with a recipient (e.g., a high number of translation ratings can be indicative of a language spoken by the recipient), a trustworthiness of the translation ratings associated with the recipient (e.g., if the recipient's translation rating appears trustworthy—e.g., consistent with other provided translation ratings—the trustworthy translation rating can be indicative of a language spoken by the recipient), and a weight of the translation ratings associated with the recipient (e.g., heavily weighted translation ratings can be indicative of a language spoken by the recipient).

In one or more embodiments, the electronic message delivery manager 206 can provide weights for the various types of information. In some cases, certain pieces of information related to a user are more indicative of a language spoken by the user. For example, information that is more indicative of a language spoken by a user can include, but is not limited to, where the user currently lives, where the user has lived in the past, where the user attended school, where the user works, a language spoken by a person the user is married to, languages associated with frequent translation ratings submitted by the user, etc. Information that is less indicative of a language spoken by a user, but is still useful in determining languages preferences of the user, can include languages spoken by the user's social networking system friends, languages associated with groups or webpages liked by the user, locations where the user frequently checks in, etc. Accordingly, in one or more embodiments, the electronic message delivery manager 206 can give a heavier weight to information that is more indicative of a language spoken by the sender or recipient in determining a predominant language preference for the sender or recipient.

The language analysis performed by the electronic message delivery system 206 can be based on each of the user information categories described above individually. Additionally or alternatively, the electronic message delivery system 206 can include various combinations of user information categories in the language analysis in order to determine a predominant language associated with an electronic message recipient. Based on the language analysis, the electronic message delivery system 206 can determine which version of the electronic message to send to the electronic message recipient. If the predominant language determined for the recipient is the same as the electronic message, the electronic message delivery system 206 can provide the electronic message to the recipient. If the predominant language determined for the recipient is the same as the translation of the electronic message, the electronic message delivery system 206 can provide the translation of the electronic message to the recipient. If the predominant language determined for the recipient is not the same as the electronic message or the translation of the electronic message, the electronic message delivery system 206 may default to provide the electronic message in a language associated with where the recipient is currently located or with the original language of the electronic message.

Additionally, as mentioned above and as illustrated in FIG. 2, the translation system 106 can include the data storage 208. As shown, the data storage 208 can include user profile data 210, user social networking activity data 212, translation rating data 214, and electronic message data 216. In one or more embodiments, the user profile data 210 can include data representative of user profile information, such as described herein. Similarly, in one or more embodiments, the user social networking activity data 212 and the translation rating data 214 can include data representative of the social networking information and translation rating information, respectively, also as described herein. Finally, in one or more embodiments, the electronic message data 216 can include any information related to an electronic message received by the translation system (i.e., the contents of the electronic message, the sender of the electronic message, one or more recipients of the electronic message, and provided or generated translations of the electronic message, etc.).

Figure 3:
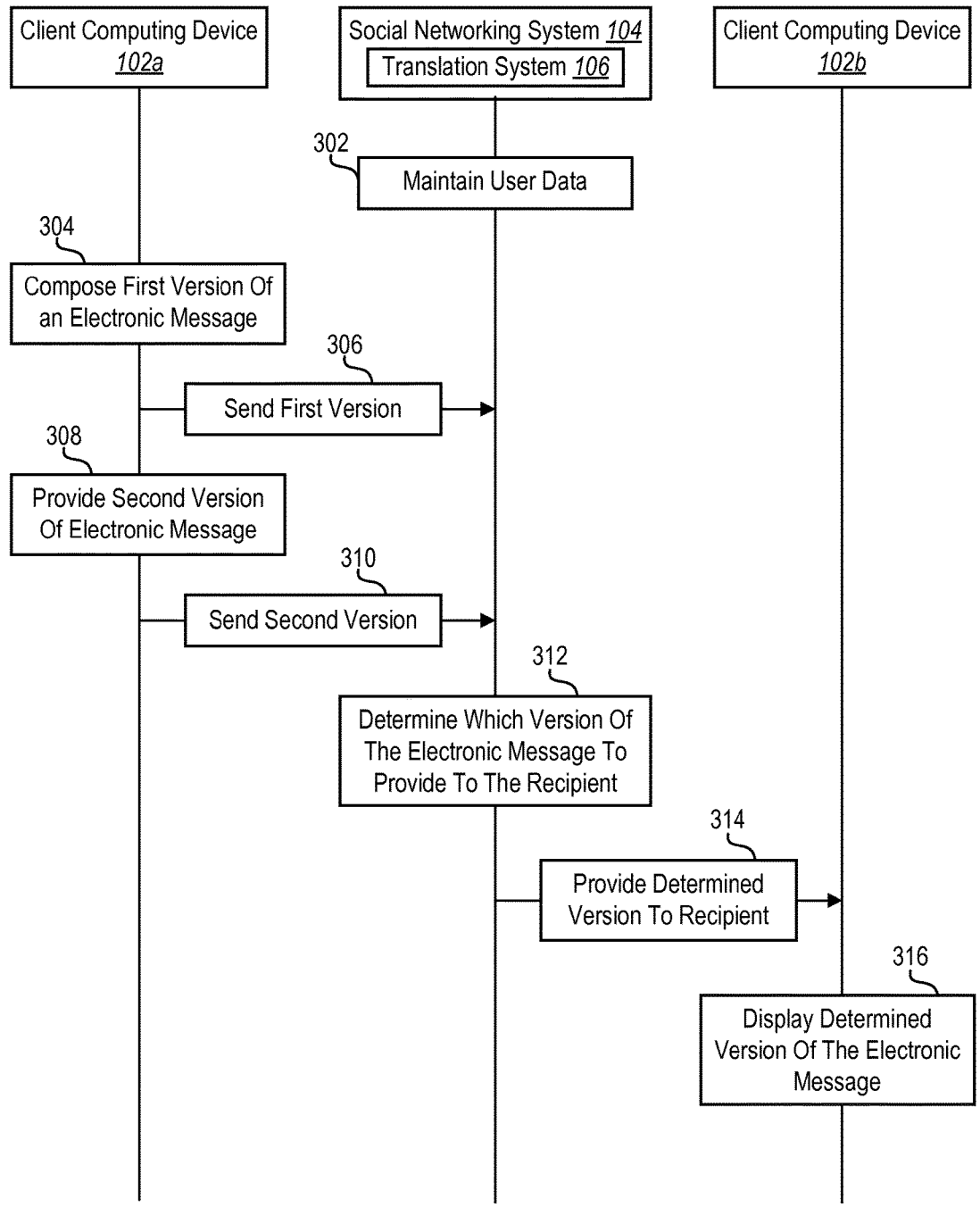
FIG. 3 illustrates a sequence-flow diagram illustrating interactions as part of a translation process between a message sender and a message recipient in accordance with one or more embodiments.
Figure 4:
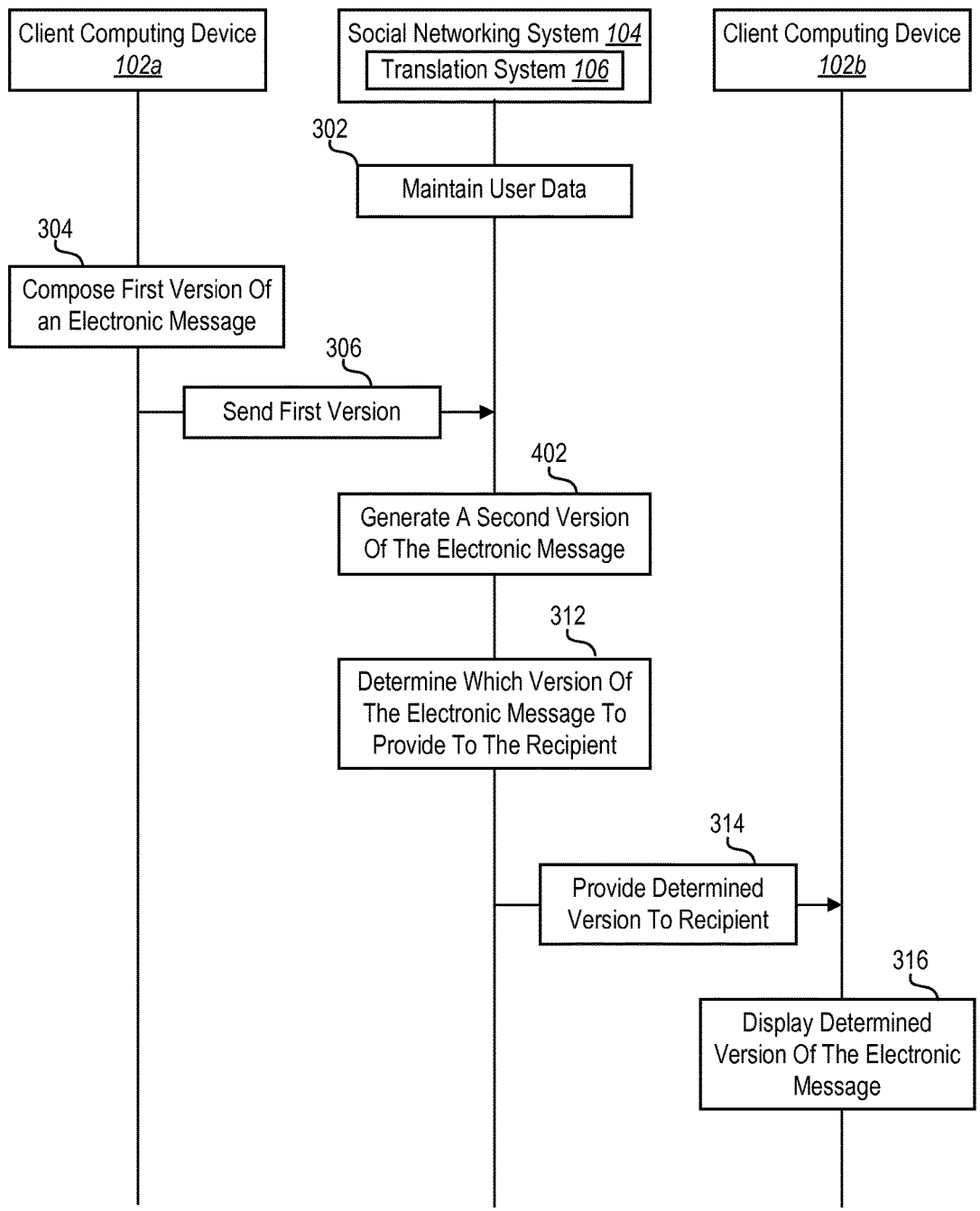
FIG. 4 illustrates a sequence-flow diagram illustrating interactions as part of a translation process between a message sender and a message recipient in accordance with one or more embodiments.

As discussed, the systems and methods laid out above with reference to FIGS. 1-2 can allow a message sender to provide an electronic message to a recipient via the system 100 in a predominant or preferred language associated with the recipient, regardless of any language ability possessed by the message sender. FIGS. 3-4 illustrate example process diagrams of one or more example embodiments of processes implemented by the system 100 discussed above. Consistent with the system 100 illustrated in FIGS. 1 and 2, FIGS. 3-4 illustrate the client computing device 102*a* acting as a sender of an electronic message, the client computing device 102*b* acting as a recipient of the electronic message, and the social networking system 104 that supports the translation system 106.

In one or more embodiments, the translation process begins with the translation system 106 maintaining user data 302. As described above, the translation system 106 can receive and analyze a wide variety of information related to both the message sender, as well as with one or more message recipients. The translation system 106 can then maintain this information in the data storage 208 as user profile data 210, user social networking activity data 212, and translation rating data 214. In some embodiments, the translation system 106 can receive and maintain this information continuously. In other embodiments, the translation system 106 may receive and maintain this information for only predetermined amounts of time.

At some point after the translation system 106 has started maintaining user data 302, the user 110*a* can compose a first version of an electronic message 304 via the client computing device 102*a*. In one or more embodiments, the first version of the electronic message is the electronic message in a first language. The first language may be the native language of the user 110*a*, or may be a language that the user 110*a* understands besides his native language. In one embodiment, the user 110*a* can compose the first version of the electronic message via a graphical user interface on the client computing device 102*a* using a touch screen display or other input device. Once the user 110*a* composes the first version of the electronic message, the client computing device 102*a* can send the first version 306 of the electronic message to the translation system 106.

As mentioned above, the sender of an electronic message can also provide a translation of the electronic message. For example, as shown in FIG. 3, the user 110*a* can provide a second version of the electronic message 308 via the client computing device 102*a*. In one or more embodiments, the second version of the electronic message is the electronic message in a second language. The user 110*a* can provide the second version of the electronic message via a graphical user interface on the client computing device 102*a* using a touch screen display or other input device.

Once the user 110*a* provides the second version of the electronic message, the client computing device 102*a* can send the second version 310 of the electronic message to the translation system 106. In an alternative embodiment, the user 110*a* can compose and provide the first version and the second version of the electronic message at the same time. Additionally, in an alternative embodiment, the client computing device 102 can send the first version 306 and the second version 310 at the same time. In one embodiment, the user 110*a* can provide an indication of one or more recipients of the electronic message along with the first version and the second version of the electronic message. Additionally, the user 110*a* can also provide an indication regarding the language represented in the first and the second versions of the electronic message.

Additionally, or alternatively, in one embodiment, after the user 110*a* provides the first version of the electronic message, the translation system 106 may prompt the user 110*a* to provide the second version of the electronic message. For example, the user 110*a* may be associated with social networking information that indicates the user 110*a* is capable of providing the second version of the electronic message. For instance, the user 110*a* may have provided ratings of other translations, or the translations themselves. Additionally, the user 110*a* may be associated with profile information that indicates the user 110*a* grew up in a different country than the one where the user 110*a* currently resides. Based on this and other information, the translation system 106 may also provide, within the prompt, one or more suggested languages in which the user 110*a* may provide the second version of the electronic message. In response to selecting the prompt, the translation system 106 may automatically provide a second version of the electronic message, or may provide a partial second version of the electronic message that the user 110*a* can add to. Alternatively, in response to selecting the prompt, the translation system 106 may simply provide a second text entry area where the user 110*a* can provide the full second version of the electronic message.

Additionally or alternatively, the translation system 106 may prompt the user 110*a* to provide the second version of the electronic message in response to an analysis of the recipients of the electronic message. For example, the translation system 106 can determine that all or a portion of the recipients (i.e., above a given threshold) of the electronic message understand a language that is different from the language represented in the first version of the electronic message. In response to this determination, the translation system 106 may prompt the user 110*a* to provide a second version of the electronic message. The prompt can include a suggestion (i.e., via a dropdown list, etc.) as to an appropriate language for the second version of the electronic message.

Next, the translation system 106 can determine which version of the electronic message to provide to the recipient 312. The process for determining which version of the electronic message to provide to the recipient begins with the translation system 106 identifying a language associated with each version of the electronic message. For example, the user 110*a* may have written the first version of the electronic message in English, and the second version of the electronic message in Spanish. In some embodiments, the first and/or second versions of the electronic messages may include a combination of languages (e.g., "Hola my friends! How's it going?"). In that case, the translation system 106 can base the language determination on the language most represented in the version of the electronic message being analyzed using any of a number of suitable language processing techniques.

Once the translation system 106 has identified a language associated with each version of the electronic message, the translation system 106 can identify a language associated with a recipient of the electronic message. As discussed above, the sender can specifically indicate a recipient of the electronic message (e.g., if the electronic message is a private message between the sender and the recipient). In that case, in order to determine which version of the electronic message to send to the recipient (i.e., user 110*b* via the client computing device 102*b*), the translation system 106 can analyze information associated with the recipient such as user profile information, user social networking activity information, and translation rating information. In one embodiment, the analysis of the information associated with the recipient results in a determination of a predominant language associated the recipient. If the translation system 106 determines that the predominant language associated with the recipient is the same language as that associated with the first version of the electronic message, the translation system 106 will provide the first version of the electronic message to the recipient 314. If the translation system 106 determines that the predominant language associated with the recipient is the same language as that associated with the second version of the electronic message, the translation system 106 will provide the second version of the electronic message to the recipient 314.

In one embodiment, the translation system 106 may determine that the language associated with the recipient is not the same as the language associated with the first version of the electronic message, nor is the language associated with the recipient the same as the language associated with the second version of the electronic message. In that case, the translation system 106 may default to provide the first version of the electronic message. In one or more embodiments, the user 110a may configure the translation system 106 to always default to either the first or the second version of the electronic message. Alternatively, the user 110a may configure the translation system 106 to send neither the first nor the second version of the electronic message to the recipient if the recipient is associated with a different language than those associated with the first and second versions of the electronic message. Alternatively, the user 110a may configure the translation system 106 to send a version of the electronic message in a language associated with a location related to the recipient (i.e., the recipient's hometown, travel destinations, current residence, past residences, etc.), a language based on the recipient's profile information, a language associated with a language of friends of the recipient, a language most commonly used by the recipient in posts and/or comments, etc.

In one or more embodiments, the message sender (i.e., user 110a via the client computing device 102a) may not specifically indicate a recipient for the electronic message (e.g., the sender is posting the electronic message to the social networking system for distribution to the newsfeeds of the user's "friends"). In that case, the translation system 106 may perform an analysis of all co-users associated with the sender via the social networking system (i.e., the sender's "friends,") or a subset of the sender's co-users (e.g., "friends") based on various privacy settings or group configurations, to determine which version of the electronic message to send to each co-user. For example, the user 110b may be a social networking system "friend" of the user 110a. Accordingly, in one embodiment, the translation system 106 may determine to provide the first version of the electronic message to the user 110b via the client computing device 102b in response to a determination that the user 110b is associated with the same language as that associated with the first version of the electronic message. Conversely, the translation system 106 may determine to provide the second version of the electronic message to the user 110b via the client computing device 102b in response to a determination that the user 110b is associated with the same language as that associated with the second version of the electronic message. As described above, the translation system 106 may determine to provide a default electronic message to the user 110b in response to a determination that the user 110b is not associated with the same language as that associated with the first or the second version of the electronic message.

Finally, after providing the determined version of the electronic message to the recipient 314, the client computing device 102b can display the determined version of the electronic message 316 to the user 110b. For example, in one or more embodiments, the client computing device 102b can display the determined version of the electronic message via a graphical user display. Additionally, in one embodiment, the client computing device 102b may include an indicator as to which version of the electronic message is displayed (e.g., "original" displayed for the first version and "translated" for the second version).

FIG. 3 is directed to a sequence of events that include a message sender providing both the electronic message as well as a translation of the electronic message. In another embodiment, the sender may only provide the electronic message, and the translation system 106 can provide one or more translations of the electronic message. For example, as shown in FIG. 4, the user 110a can compose the first version of the electronic message 304 and send the first version of the electronic message 306 via the client computing device 102a. In response to receiving the first version of the electronic message, and after maintain user data 302, the translation system 106 can generate a second version (i.e., a translation) of the electronic message 402.

The translation system 106 can begin the process for generating a second version of the electronic message 402 by determining a language in which to generate the second version of the electronic message. The translation system 106 can base the determination of the language on an analysis of information associated with the sender, on an analysis of information associated with a single indicated recipient, or on an analysis of information associated with a group of recipients (e.g., recipients specifically identified by the user 110a, all "friends" of the user 110a, or "friends of friends" associated with the user 110a). Each of these scenarios will be discussed below.

First, the translation system 106 may base the determination of the language for the second version of the electronic message on an analysis of the sender's information in response to a preconfigured setting by the sender, or if there is no information available for one or more recipients on which the translation system 106 may base a language analysis. In other words, the sender may be sending an electronic message to a recipient for whom the translation system 106 has little user profile information, user social networking activity information, and/or translation rating information. In that case, the translation system 106 may determine that the electronic message sender is associated with user information that indicates the sender is associated with a language other than that represented in the first version of the electronic message. Accordingly, the translation system 106 may generate a second version of the electronic message in the second language associated with the sender.

Second, the translation system 106 may base the determination of the language for the second version of the electronic message on an analysis of information associated with a single indicated recipient in response to the message sender specifically indicating one recipient for the electronic message. In that case, the translation system 106 can perform a language analysis on the user information associated with the indicated recipient including user profile information, user social networking activity information, and translation rating information. The translation system 106 can determine a language associated with the recipient based on the language analysis, and generate a second version of the electronic message in the determined language.

Third, the translation system 106 may base the determination of the language for the second version of the electronic message on an analysis of information associated with a group of recipients in response to the message sender indicating no particular recipient for the electronic message (i.e., the electronic message is a post meant for distribution to all the sender's "friends"). In that case, the translation system 106 can generate a second version of the electronic message in a language most represented among the recipients. For example, the translation system 106 can analyze information associated with each of the recipients to determine one or more languages associated with the recipients. In the event the translation system 106 determines that more than one language is associated with the recipients, the translation system 106 may generate the second version of the electronic message in the language associated with the largest number of recipients (besides the language associated with the first version of the electronic message).

In one or more embodiments, the user 110a can edit the second version of the electronic message generated by the translation system 106. For example, in some embodiments, the translation system 106 can present the second version of the electronic message to the user 110a before providing the second version of the electronic message to the recipient(s). In this case, the user 110a can edit the second version to correct inaccuracies in the generated second version of the electronic message, to include words or terms the user 110a feels better express the sentiment included in the first version of the electronic message, to include slang terms or informalities that make the second version of the electronic message seem more genuine, to customize the second version of the electronic message, and/or to edit the second version of the electronic message in any other way seen fit by the user 110a. In response to the user 110a editing the second version of the electronic message, the translation system 106 can provide the edited second version of the electronic message to the recipient(s).

Alternatively, rather than generating only a second version of the electronic message, the translation system 106 may generate (or receive from the user 110a) multiple versions of the electronic message in multiple languages. For example, if the translation system 106 determines that more than one language is associated with the recipients, as mentioned above, the translation system 106 may generate a version of the electronic message for each language identified among the multiple recipients. In some embodiments, the translation system 106 may generate a different version of the electronic message for each percentage of the identified recipients above a given threshold (e.g., more than 15%) who understand a language other than the language in which the first version of the electronic message is written. Accordingly, in at least one embodiment, the translation system 106 may provide a tailored translation for every possible recipient of an electronic message.

Once the translation system 106 has generated a second version of the electronic message 402, the translation system 106 can determine which version of the electronic message to provide to the recipient 312. As discussed above, the translation system 106 can determine which version of the electronic message to provide to the recipient in response to a language analysis based on user information associated with the recipient. The translation system 106 can perform the language analysis based on user profile information associated with the recipient, on user social networking activity information associated with the recipient, and/or on translation rating information associated with the recipient. If the translation system 106 determines the language associated with the recipient is the same as the language associated with the first version of the electronic message, the translation system 106 can provide the first version of the electronic message to the recipient 314. If the translation system 106 determines the language associated with the recipient is the same as the language associated with the second version of the electronic message, the translation system 106 can provide the second version of the electronic message to the recipient 314.

Additionally or alternatively, if the translation system 106 generated multiple versions of the electronic message, the translation system 106 can determine to provide a version of the electronic message that corresponds with a language associated with each of the multiple recipients. For example, the user 102a may provide an electronic message in English for delivery to multiple recipients including users who understand Spanish, German, and French. Accordingly, the translation system 106 can determine to provide a Spanish version of the electronic message to the Spanish speaking recipient, a German version of the electronic message to the German speaking recipient, and a French version of the electronic message to the French speaking recipient.

Finally, the client computing device 102b can display the determined version of the electronic message 316. For example, the client computing device 102b may display the determined version of the electronic message to the user 110b via a display of the client computing device 102b. In one or more embodiments, the client computing device 102b may also display an indicator along with the electronic message notifying the user 110b as to which version of the electronic message is being displayed.

As will be described in more detail below, the components of the system 100 as described with regard to FIGS. 1-4 can provide, along and/or in combination with the other components, one or more graphical user interfaces ("GUIs"). In particular, the components can allow a user to interact with a collection of display elements for a variety of purposes. In particular, FIGS. 5A-5C and the description that follows illustrate various example embodiments of the user interfaces and features that are in accordance with general principles as described above.

Figure 5C:
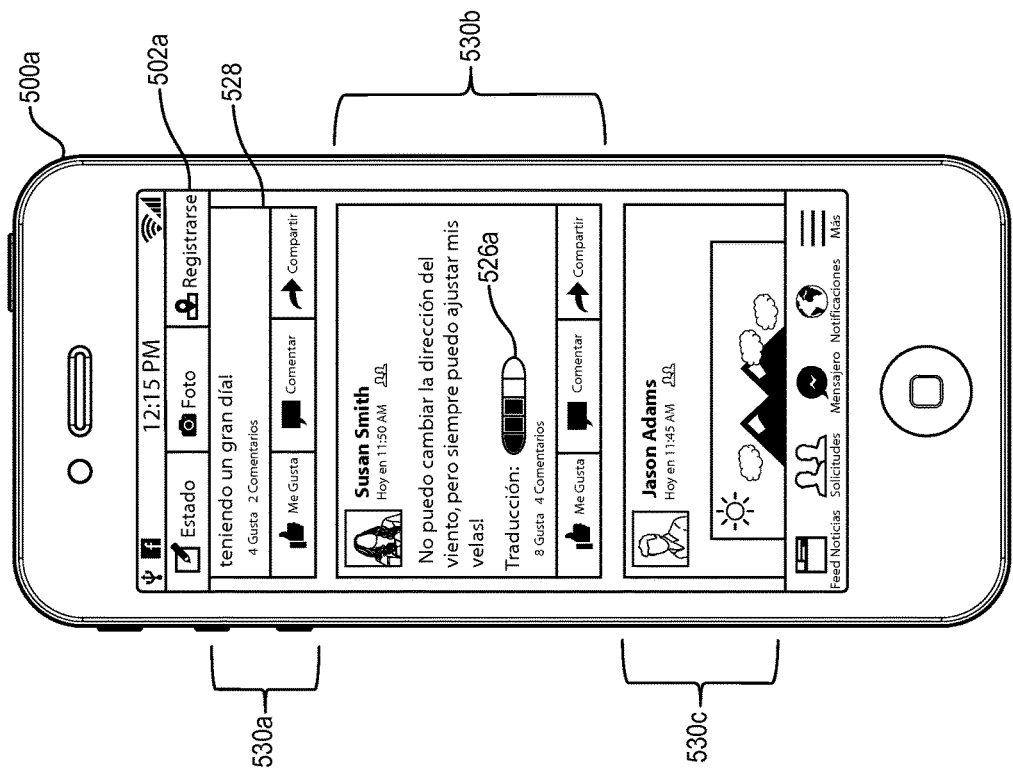

For example, FIGS. 5A-5C illustrate various views of GUIs provided at the client computing device 102a, 102b, or 102c by way of a social networking application. As mentioned above, in some embodiments, a client computing device (i.e., client computing device 102a, 102b, or 102c) can implement part or all of the system 100. For example, FIG. 5A illustrates a computing device 500 that may implement one or more of the components or features of the translation system 106. As shown, the computing device 500 is a handheld device, such as a mobile phone device (e.g., a smartphone). As used herein, the term "handheld device" refers to a device sized and configured to be held/operated in a single hand of a user. In additional or alternative examples, however, any other suitable computing device, such as, but not limited to, a tablet device, larger wireless devices, laptop or desktop computer, a personal-digital assistant device, and/or any other suitable computing device can perform one or more of the processes and/or operations described herein.

As illustrated in FIG. 5A, the computing device 500 includes a touch screen display 502 that can display user interfaces and by way of which user input may be received and/or detected. As used herein, a "touch screen display" refers to the display of a touch screen device. In one or more embodiments, a touch screen device may be a client computing device 102a, 102b, or 102c with at least one surface upon which a user may perform touch gestures (e.g., a laptop, a tablet computer, a personal digital assistant, a media player, a mobile phone). Additionally or alternatively, the computing device 500 may include any other suitable input device, such as a touch pad or those described below in reference to FIG. 8.

In FIG. 5A, the touch screen display 502 of the computing device 500 displays an electronic message composition GUI 504 provided by a social networking application installed thereon. In one or more embodiments, the electronic message composition GUI 504 allows a user to compose electronic messages for submission to the social networking system 104. The electronic message composition GUI 504 can include a recipient control 506, an electronic message input control 508, and a touch screen display keyboard 501.

In one or more embodiments, an electronic message sender can specify one or more recipients for the electronic message with the recipient control 506. For example, the sender can utilize the recipient control 506 to specify a single recipient for the electronic message. Alternatively, the sender can utilize the recipient control 506 to specify multiple recipients, or a group of recipients (e.g., "Work Friends"). Additionally or alternatively, the sender may leave the recipient control 506 blank. In that case, the social networking system may send any electronic message composed by the sender to all co-users of the social networking system with whom the sender is associated (i.e., the electronic message displayed in the electronic message input control 508 is a post from the sender).

In one or more embodiments, the sender of an electronic message can compose the content of the electronic message using the electronic message input control 508. For example, as shown in FIG. 5A, the electronic message input control 508 is a text box where the sender can type the content of the electronic message via the touch screen display keyboard 510. In some embodiments, the sender can include multimedia elements in the electronic message (e.g., digital photos, videos, GIFs, etc.), tags, location check-ins, and other types of information/content in addition to or in place of simple text. The electronic message input control 508 can also include various identification elements for the sender, such as a screen name and/or profile picture.

In some embodiments, the message sender can include additional elements in an electronic message by interacting with various buttons such as a translation button 512. For example, as shown in FIG. 5A, the sender may select the translation button 512 with a finger 514. In response to the sender selecting the translation button 512, the electronic message composition GUI 504 can include a translation control 516, as shown in FIG. 5B. In one or more embodiments, the translation control 516 can include a translation prompt 518, a language indicator dropdown list 520, an auto-translate button 522, an add translation button 524, and a translation rating control 526.

The message sender may type in a translation of the electronic message displayed in the electronic message input control 508 by selecting the translation prompt 518. For example, in one embodiment, if the message sender is bi-lingual, he can simply type out a translation of the electronic message by selecting the translation prompt 518 and typing out the translation via the touch screen display keyboard 510. In some embodiments, the layout of the touch screen display keyboard 510 may change to include non-QWERTY keyboard layouts, according to a language associated with the message sender.

The message sender can specify a language associated with the content typed into the translation control 516 by selecting a language in the language indicator dropdown list 520. For example, the language indicator dropdown list 520 can include a selectable list of all the languages supported by the translation system 106. In one or more embodiments, after the message sender adds the electronic message translation to the translation control 516, the message sender can specify a language for the translation by selecting the correct language from the language indicator dropdown list 520 (i.e., the language selected in the language indicator dropdown list 520, "Español," corresponds with the language of the content of the translation control 516). By providing a specified language for the translation via the language indicator dropdown list 520, the message sender is ensuring that there will be no errors with regard to the translation system 106 identifying a language associated with the translation. Additionally or alternatively, the translation system 106 can auto-detect the language associated with the content typed into the translation control 516 and populate the dropdown list 520 with the auto-detected language. In that case, the message sender can correct the translation system 106 via the dropdown list 520 if the translation system 106 incorrectly auto-detects the language.

As described above, in some embodiments, the message sender may not provide a translation of the electronic message. In that case, the message sender may have the translation system 106 provide a translation of the electronic message. For example, in one embodiment, the message sender can select a desired language for the translation by selecting a language indicator dropdown list 520. Next, in response to the message sender tapping the auto-translate button 522, the translation system 106 can provide a translation of the content of the electronic message input control 508 in the language selected from the language indicator dropdown list 520. In one embodiment, after the translation system 106 provides the translation of the electronic message, the message sender can add to or edit the translation by selecting the translation prompt 518 and typing via the touch screen display keyboard 510. Thus, in this embodiment, the translation system 106 can provide the translated text contained in the translation control 516, where in other embodiments, the message sender can provide the translated text contained in the translation control 516.

In other embodiments, the message sender may not know what language into which the electronic message should be translated or may want multiple translations provided according to the diversity that exists among the message sender's social networking "friends." Accordingly, in one embodiment, the message sender may not select any language from the language indicator dropdown list 520 before tapping the auto-translate button 522. In that case, the translation system 106 will determine a language or languages into which the electronic message should be translated. For example, as described in greater detail above, the translation system 106 may determine to translate the electronic message into a given language in light of a language analysis based on information associated with the message sender. Alternatively or additionally, the translation system 106 may determine to translate the electronic message into a given language in light of a language analysis based on information associated with a recipient specifically named in the recipient control 506.

Alternatively or additionally, the translation system 106 may determine to translate the electronic message into a given language in light of a language analysis based on information associated with a majority of foreign language speakers among the co-users associated with the message sender via the social networking system 104. Alternatively or additionally, the translation system 106 may determine to translate the electronic message into every language represented among the message sender's social networking system "friends" in light of a language analysis based on information associated with all the co-users associated with the message sender via the social networking system 104. In one or more embodiments, the message sender may configure the translation system 106 such that the translation system 106 performs auto-translate features in accordance with the message sender's desires.

If the message sender wants more than one translation for the electronic message, but perhaps less translations than would be needed for all of the message sender's social networking system "friends," the message sender can add translations for the electronic message one-by-one by selecting the add translation button 524. For example, in response to the message sender's selection of the add translation button 524, the translation control 516 can add another set of controls containing a second translation prompt, a second language indicator dropdown list, a second auto-translate button a second add translation button, and a second translation rating control. Thus, by utilizing the add translation button 524, the message sender can either provide translations or request auto translations for the electronic message in as many languages as the message sender desires.

As mentioned above, the message sender can also rate a translation generated by the translation system 106 and contained within the translation control 516. In this way, the translation system 106 can improve the generated translations it provides based on sender feedback. For example, as shown in FIG. 5B, the message sender can rate the translation displayed in the translation control 516 by selecting the translation rating control 526. In one or more embodiments, the translation rating control 526 can be a "pill," wherein the message sender can select a number of pill segments to represent a confidence score assigned by the message sender (i.e., a selection of two segments out of five in the pill can indicate that the message sender not very confident in the accuracy or correctness of the translation). In alternative embodiments, the translation rating control 524 may be in an alternate format (e.g., star ratings, thumbs up, etc.).

In an alternative embodiment, rather than providing translation controls in response to a user tapping the translation button 512, the translation system may provide a prompt to the message sender regarding a translation, as the message sender is composing the electronic message in the electronic message input control 508. For example, in response to the user's recipient selection(s) or non-selection of recipients in the recipient control 506 and to the user composing an electronic message in the electronic message input control 508, the translation system 106 may determine that one or more recipients of the electronic message is associated with a predominant language other than the language represented in the electronic message. Accordingly, the translation system 106 may provide a prompt via the electronic message composition GUI (not shown) informing the message sender that the message sender may provide a translation of the electronic message. Alternatively, the prompt may inform the message sender that the translation system 106 can provide the translation of the electronic message. In one embodiment, the prompt may also include a generated translation of the electronic message.

Once the message sender has completed composing the electronic message and possibly the translation of the electronic message, the message sender may submit the electronic message to the social networking system 104 for delivery to one or more intended recipients. For example, as shown in FIG. 5C, the electronic message can be displayed by a social networking newsfeed GUI 528 on a display 502*a* of a computing device 500*a* associated with a recipient of the electronic message. In one or more embodiments, the social networking newsfeed GUI can include multiple electronic message controls 530*a*, 530*b*, and 530*c* including corresponding messages and selectable options. In one embodiment, prior to providing the translated version of the electronic message displayed in the electronic message input control 508, the translation system 106 performed a language analysis based on information associated with the message recipient (i.e., the user of the computing device 500*a*) in order to determine that the Spanish is the best language for the recipient. Accordingly the translation system 106 provided the translation of the electronic message displayed in the electronic message control 530*b*, as shown in FIG. 5C. In some embodiments, the electronic message control 530*b* may include an indicator (e.g., "Spanish Translation," not shown) notifying the message recipient that the text contained within the electronic message control 530*b* is a translation and not the original text. In that case, the electronic message control 530*b* may include another control (e.g., "see translation," not shown) that allows the message recipient to view the electronic message in its original language.

In one or more embodiments, the electronic message control 530*b* can also include the translation rating control 526*a*. As shown, in some embodiments, the translation rating control 526*a* can display an average translation rating for the electronic message displayed in the electronic message control 530*b*. The average translation rating is representative of an average taken by the translation system 106 of translation ratings provided by other recipients of the electronic message displayed in the electronic message control 530*b*. In one embodiment, the recipient associated with the computing device 500*a* can add to the average translation rating displayed by the translation rating control 526*a* by selecting a number of segments within the translation rating control 526*a*. Thus, the average translation rating displayed to the next recipient of the electronic message will include the translation rating of the recipient associated with the computing device 500*a*. Over time, the average translation rating of the electronic message contained within the electronic message control 530*b* can affect the confidence the translation system 106 assigns to translations provided by the sender of the electronic message contained within the electronic message control 530*b*.

In some embodiments, the electronic message control 530*b* can include another control (not shown) that allows the message sender or the message recipient to edit the existing message translation or to provide yet another translation of the electronic message. For example, even though the message sender has already sent the electronic message displayed within the electronic message control 530*b*, the translation system 106 can allow the message sender or recipient to further edit the translation. In response to receiving an edit to a posted electronic message, the translation system 106 can update the posted electronic message in any feed where the original electronic message is included. Additionally, in response to receiving another translation of the posted electronic message, the translation system 106 can provide the new translation to recipients determined to understand the language associated with the new translation. The process for editing the existing translation or providing a new translation is the same as described above with reference to FIGS. 5A and 5B. In some embodiments, the original message sender may receive a notification that a translation of the electronic message provided by the sender has been edited or that another translation of the electronic message has been provided. In that case, the translation system 106 may request approval from the message sender before updating/posting the new translation of the electronic message.

In one or more additional embodiments, the electronic message control 530*b* can also include an auto-translate button 522 (not shown). For example, it is possible that the translation system 106 may have incorrectly determined that a recipient's predominant language is Spanish, when in fact the recipient's predominant language is English. In that case, the translation system 106 may provide a Spanish translation of an electronic message to the recipient that the recipient cannot understand. Accordingly, the recipient can simply tap the auto-translate button 522 (not shown) in order to be provided with the electronic message in a language he can understand. Alternatively, the electronic message control 530*b* may include a dropdown listing (not shown) of languages available for the provided message. Accordingly, the recipient himself can choose which version of the message to view within the electronic message control 530*b*.

FIGS. 1-5C, the corresponding text, and the examples, provide a number of different methods, systems, and devices for providing a translation of an electronic message via a social networking system. In addition to the foregoing, embodiments can also be described in terms of flowcharts comprising acts and steps in a method for accomplishing a particular result. For example, FIGS. 6-7 may be performed with less or more steps/acts or the steps/acts may be performed in differing orders. Additionally, the steps/acts described herein may be repeated or performed in parallel with one another or in parallel with different instances of the same or similar steps/acts.

Figure 6:
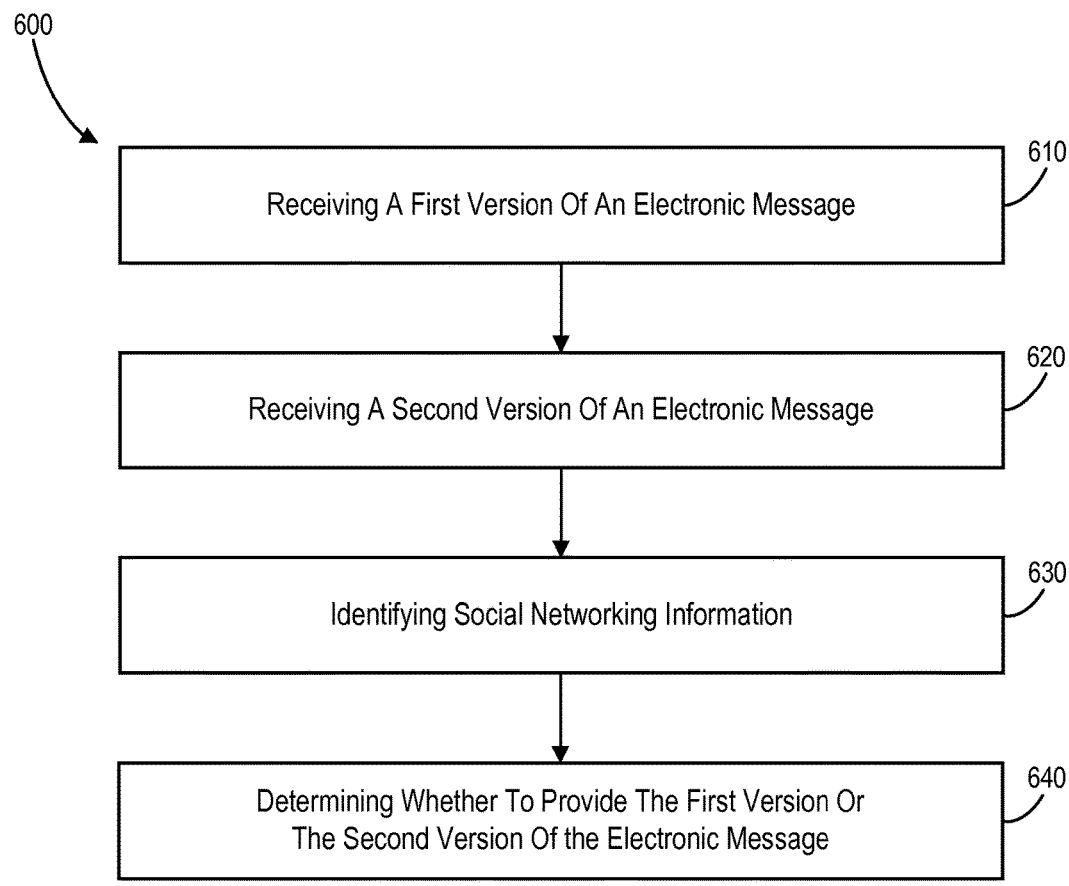
FIG. 6 illustrates a flowchart of a series of acts in a method of providing a translation of an electronic message via a social networking system in accordance with one or more embodiments.

FIG. 6 illustrates a flowchart of one example method 600 of providing a translation of an electronic message via a social networking system. The method 600 includes an act 610 of receiving a first version of an electronic message. In particular, the act 610 can involve receiving, from a sender, a first version of an electronic message, wherein the first version of the electronic message is in a first language. In one or more embodiments, receiving, from a sender, a first version of the electronic message further includes receiving an indication of the first language.

The method 600 further includes an act 620 of receiving a second version of an electronic message. In particular, the act 620 can involve receiving, from the sender, a second version of the electronic message, wherein the second version of the electronic message is in a second language. In one or more embodiments, receiving, from a sender, a first version of the electronic message further includes receiving an indication of the second language.

Additionally, the method 600 includes an act 630 of identifying social networking information. In particular, the act 630 can involve identifying social networking information associated with a recipient. In one or more embodiments, identifying social networking information associated with a recipient can include one or more of identifying one or more activities (e.g., electronic message interactions, check-ins, etc.) performed by the recipient, identifying one or more locations associated with the recipient, identifying one or more social network transactions performed by the recipient, identifying one or more connections of the recipient along with information associated with the one or more connections, identifying recipient-provided profile information, identifying one or more translation ratings provided by the recipient, or identifying any other information related to the recipient, such as disclosed herein.

For example, in some embodiments, identifying one or more electronic message interactions performed by the recipient can include identifying one or more of electronic messages commented on by the recipient, electronic messages liked by the recipient, comments made by the recipient, or electronic messages shared by the recipient. Additionally, for example, in some embodiments, identifying one or more locations associated with the recipient can include identifying one or more of a current location associated with the recipient, a location where the recipient came from, a location where the recipient has checked-in, a location where the recipient has traveled to, a location where the recipient works, one or more locations where the recipient has lived, or a location associated with where the recipient was educated. Furthermore, for example, in some embodiments, identifying one or more social network transactions performed by the recipient can include identifying one or more of a purchase made by the recipient via a social networking system, a purchase made by the recipient announced via the social networking system, a currency associated with a purchase made by the recipient via the social networking system, a product recommended by the recipient via the social networking system, or a point of origin for a product purchased by the recipient via the social networking system. In one or more embodiments, identifying one or more social networking activities performed by a recipient can be performed automatically without human intervention.

Furthermore, the method 600 can include an act 640 of determining whether to provide the first version or the second version of the electronic message. In particular, the act 640 can involve determining, based on the identified social networking information associated with the recipient, whether to provide the first version of the electronic message or the second version of the electronic message to the recipient. In one or more embodiments, determining whether to provide the first version of the electronic message or the second version of the electronic message to the recipient can involve identifying a predominant language associated with the one or more social networking activities performed by the recipient; determining whether the second language is the same language as the predominant language; if the second language is the same language as the predominant language, determining to provide, to the recipient, the second version of the electronic message; if the second language is not the same language as the predominant language, determining to provide, to the recipient, the first version of the electronic message. The act of determining whether to provide the first version of the electronic message or the second version of the electronic message to the recipient can be performed automatically and without human intervention. Following this, in one embodiment, the method 600 further includes providing, based on the determination, the first version of the electronic message or the second version of the electronic message to the recipient.

The method 600 can also include an act of identifying one or more social network profile settings associated with the recipient. In that case, the act of determining whether to provide the first version of the electronic message or the second version of the electronic message to the recipient can be further based on the identified one or more social network profile settings associated with the recipient. In one embodiment, identifying one or more social network profile settings associated with the recipient can include identifying one or more of a preferred language of the recipient, or a location setting of the recipient. Notably, language settings for the recipient can be considered separate and apart from social networking information associated with the recipient. In particular, the identification of a preferred language for a recipient can be performed independent of any explicit language settings for the recipient. Additionally, the method 600 can include an act of identifying social networking information associated with one or more friends of the recipient, wherein the social networking information associated with one or more friends of the recipient comprises one or more of a location associated with one or more friends of the recipient, or a preferred language associated with one or more friends of the recipient. In that case, the act of determining whether to provide the first version of the electronic message or the second version of the electronic message to the recipient can be further based on the identified social networking information associated with one or more friends of the recipient.

Figure 7:
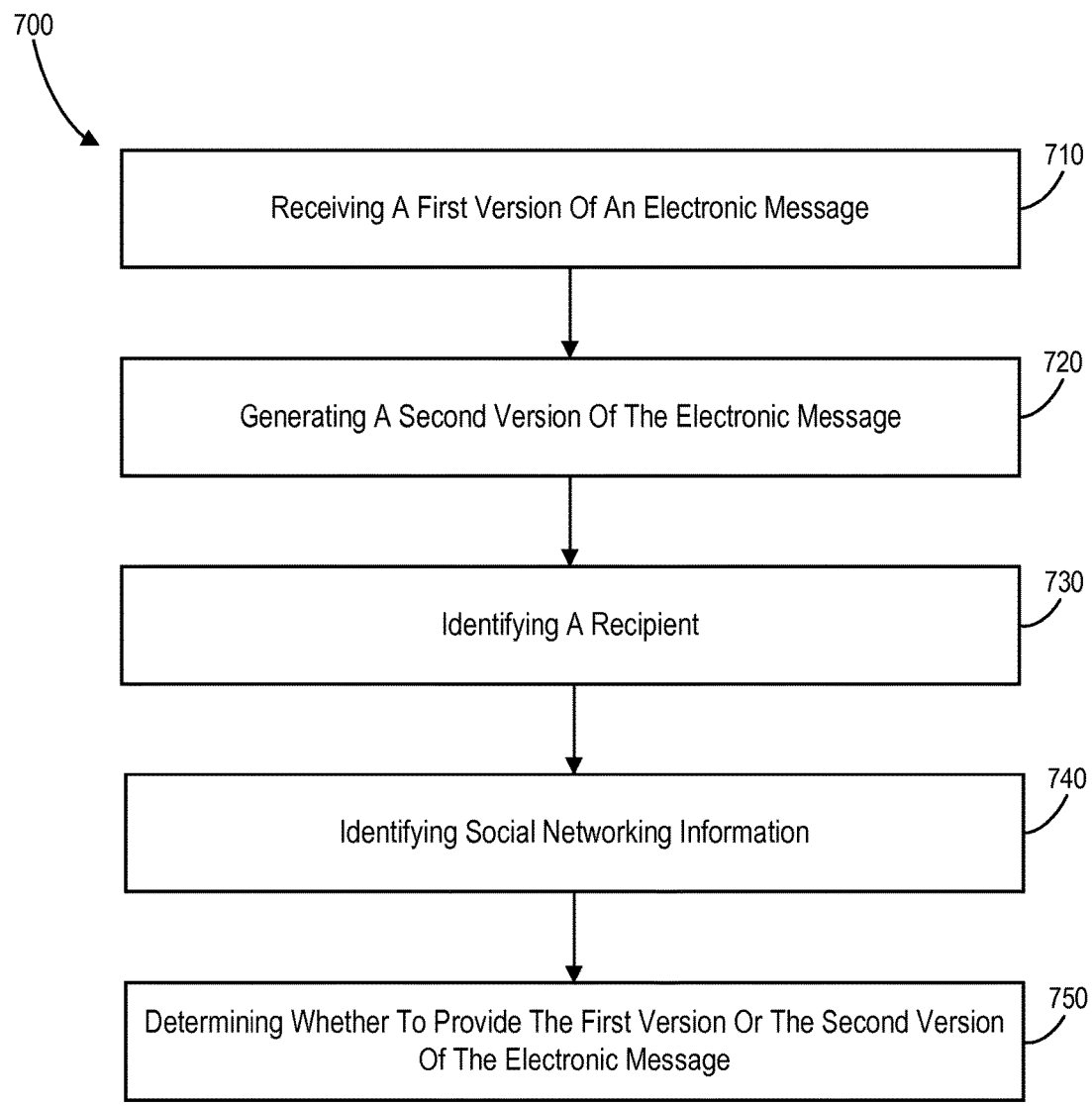
FIG. 7 illustrates a flowchart of a series of acts in a method of providing a translation of an electronic message via a social networking system in accordance with one or more embodiments.

FIG. 7 illustrates a flowchart of one example method 700 of providing a translation of an electronic message via a social networking system. The method 700 includes an act 710 of receiving a first version of an electronic message. In particular, the act 710 can include receiving a first version of an electronic message, wherein the first version of the electronic message is in a first language.

The method 700 further includes an act 720 of generating a second version of the electronic message. In particular, the act 720 can include generating a second version of the electronic message, wherein the second version of the electronic message is in a second language. In one or more embodiments, generating a second version of the electronic message can be based on one or more social networking activities associated with a sender of the electronic message, one or more social networking activities associated with an identified recipient of the electronic message, or one or more translation ratings provided by the sender of the first version of the electronic message. The act of generating a second version of the electronic message can be performed automatically and without human intervention.

The method 700 can also include an act 730 of identifying a recipient. In particular, the act 730 can involve identifying a recipient of the electronic message. In one or more embodiments, identifying a recipient of the electronic message can include identifying a co-user associated with a sender of the first version of the electronic message via a social networking system.

Additionally, the method 700 includes an act 740 of identifying social networking information. In particular, the act 740 can involve identifying social networking information associated with the recipient. In one or more embodiments, identifying social networking information associated with the recipient can include identifying one or more of electronic messages commented on by the recipient, electronic messages liked by the recipient, comments made by the recipient, electronic messages shared by the recipient, a current location associated with the recipient, a location where the recipient came from, a location where the recipient has checked-in, a location where the recipient has traveled to, a purchase made by the recipient via a social network, a connection of the recipient, recipient-provided profile information for the recipient, or any other information related to the recipient. In one embodiment, the method 700 can also include an act of identifying a language indicated by the identified social networking information associated with the recipient.

Furthermore, the method 700 includes an act 750 of determining whether to provide the first version or the second version of the electronic message. In particular, the act 750 can involve determining, based on the detected social networking information associated with the recipient, whether to provide the first version of the electronic message or the second version of the electronic message to identified recipient. In one or more embodiments, determining, based on the detected social networking information associated with the recipient, whether to provide the first version of the electronic message or the second version of the electronic message to identified recipient can include identifying a predominant language from the identified languages associated with the identified social networking information associated with the recipient; determining whether the second language is the same language as the predominant language; if the second language is the same language as the predominant language, determining to provide, to the recipient, the second version of the electronic message; if the second language is not the same language as the predominant language, determining to provide, to the recipient, the first version of the electronic message. The act of determining whether to provide the first version of the electronic message or the second version of the electronic message to identified recipient can be performed automatically and without human intervention.

Additionally, the method 700 can also include an act of identifying one or more translation ratings of the second version of the electronic message, wherein the translation ratings comprise at least one of a translation rating provided by the sender, or a crowd-sourced translation rating. In that case, determining whether to provide the first version of the electronic message or the second version of the electronic message to the identified recipient can be further based on the one or more identified translation ratings. Further more, the method 700 can include an act of assigning a weight to the identified one or more social networking activities associated with the recipient. In that case, determining whether to provide the first version of the electronic message or the second version of the electronic message to the identified recipient can be further based on the assigned weights.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
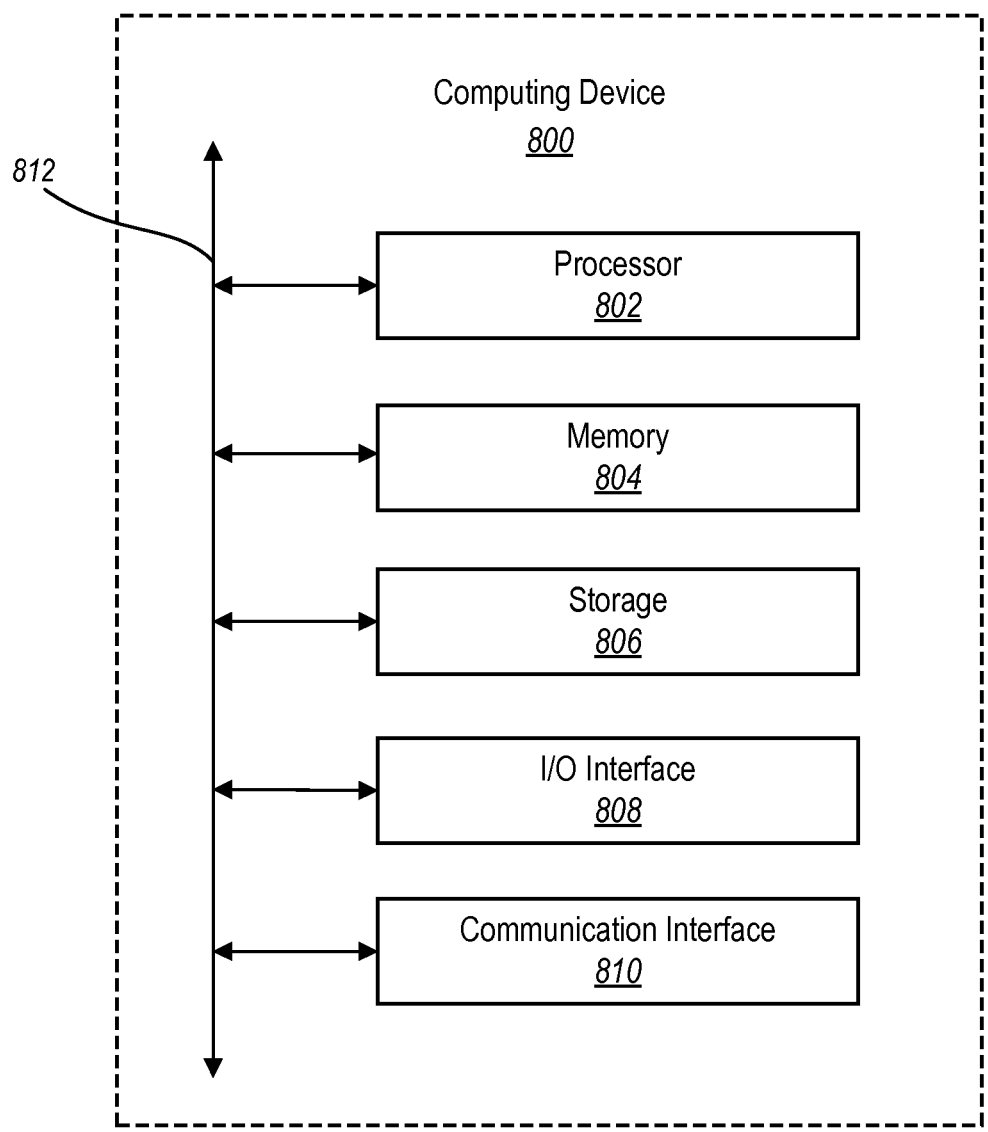
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the system 100. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social-networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 9:
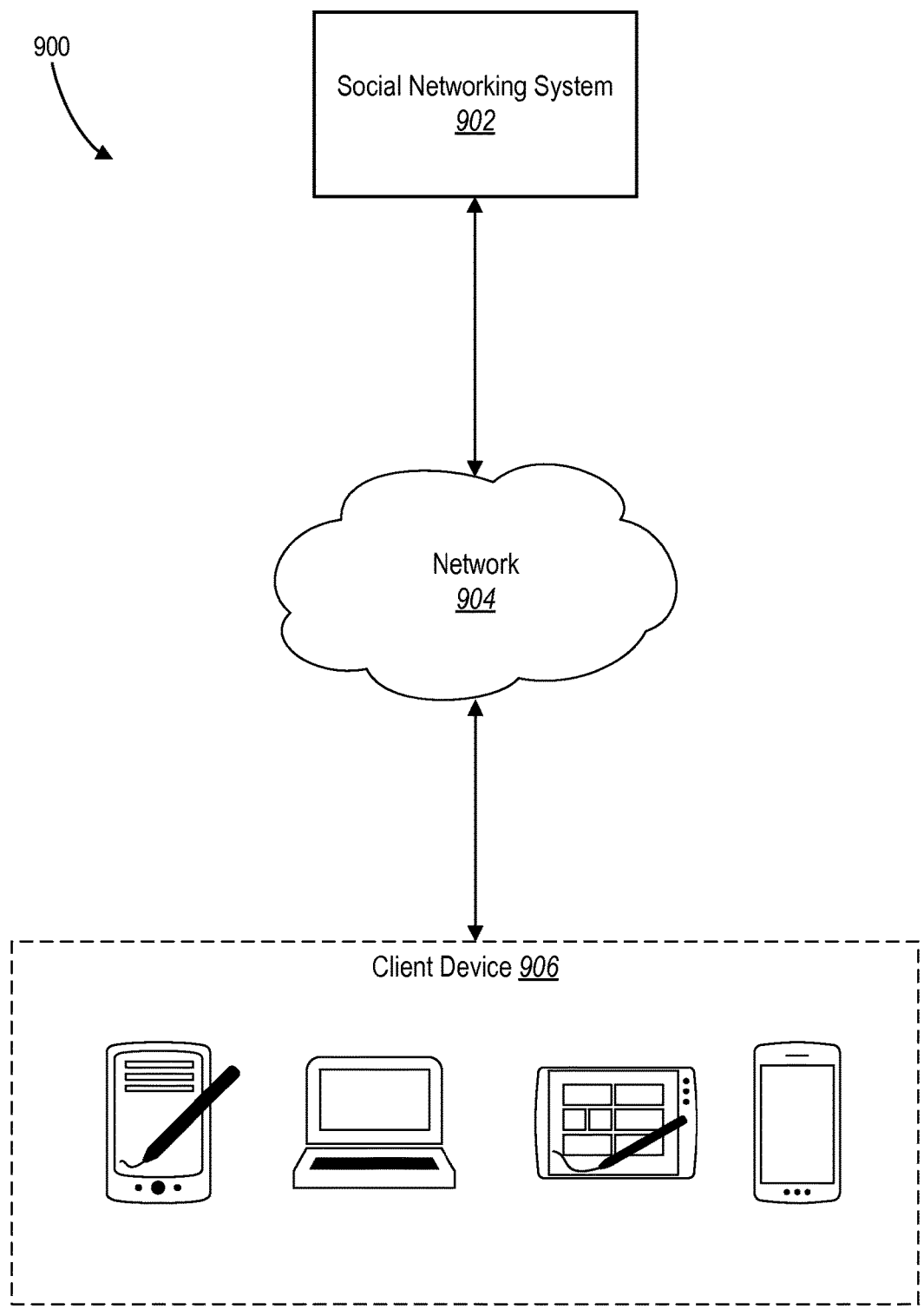
FIG. 9 is an example network environment of a social networking system in accordance with one or more embodiments.

FIG. 9 illustrates an example network environment 900 of a social-networking system. Network environment 900 includes a client system 906, a social-networking system 902, and a third-party system 908 connected to each other by a network 904. Although FIG. 9 illustrates a particular arrangement of client system 906, social-networking system 902, third-party system 908, and network 904, this disclosure contemplates any suitable arrangement of client system 906, social-networking system 902, third-party system 908, and network 904. As an example and not by way of limitation, two or more of client system 906, social-networking system 902, and third-party system 908 may be connected to each other directly, bypassing network 904. As another example, two or more of client system 906, social-networking system 902, and third-party system 908 may be physically or logically co-located with each other in whole or in part. Moreover, although FIG. 9 illustrates a particular number of client systems 906, social-networking systems 902, third-party systems 908, and networks 904, this disclosure contemplates any suitable number of client systems 906, social-networking systems 902, third-party systems 908, and networks 904. As an example and not by way of limitation, network environment 900 may include multiple client system 906, social-networking systems 902, third-party systems 908, and networks 904.

This disclosure contemplates any suitable network 904. As an example and not by way of limitation, one or more portions of network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 904 may include one or more networks 904.

Links may connect client system 906, social-networking system 902, and third-party system 908 to communication network 904 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links Links need not necessarily be the same throughout network environment 900. One or more first links may differ in one or more respects from one or more second links.

In particular embodiments, client system 906 may be an electronic device including hardware, software, or embedded logic components or a combination of two or more such components and capable of carrying out the appropriate functionalities implemented or supported by client system 906. As an example and not by way of limitation, a client system 906 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 906. A client system 906 may enable a network user at client system 906 to access network 904. A client system 906 may enable its user to communicate with other users at other client systems 906.

In particular embodiments, client system 906 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 906 may enter a Uniform Resource Locator (URL) or other address directing the web browser to a particular server (such as server, or a server associated with a third-party system 908), and the web browser may generate a Hyper Text Transfer Protocol (HTTP) request and communicate the HTTP request to server. The server may accept the HTTP request and communicate to client system 906 one or more Hyper Text Markup Language (HTML) files responsive to the HTTP request. Client system 906 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 902 may be a network-addressable computing system that can host an online social network. Social-networking system 902 may generate, store, receive, and send social-networking data, such as, for example, user-profile data, concept-profile data, social-graph information, or other suitable data related to the online social network. Social-networking system 902 may be accessed by the other components of network environment 900 either directly or via network 904. In particular embodiments, social-networking system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 906, a social-networking system 902, or a third-party system 908 to manage, retrieve, modify, add, or delete, the information stored in data store.

In particular embodiments, social-networking system 902 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 902 may provide users of the online social network the ability to communicate and interact with other users. In particular embodiments, users may join the online social network via social-networking system 902 and then add connections (e.g., relationships) to a number of other users of social-networking system 902 whom they want to be connected to. Herein, the term "friend" may refer to any other user of social-networking system 902 with whom a user has formed a connection, association, or relationship via social-networking system 902.

In particular embodiments, social-networking system 902 may provide users with the ability to take actions on various types of items or objects, supported by social-networking system 902. As an example and not by way of limitation, the items and objects may include groups or social networks to which users of social-networking system 902 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 902 or by an external system of third-party system 908, which is separate from social-networking system 902 and coupled to social-networking system 902 via a network 904.

In particular embodiments, social-networking system 902 may be capable of linking a variety of entities. As an example and not by way of limitation, social-networking system 902 may enable users to interact with each other as well as receive content from third-party systems 908 or other entities, or to allow users to interact with these entities through an application programming interfaces (API) or other communication channels.

In particular embodiments, a third-party system 908 may include one or more types of servers, one or more data stores, one or more interfaces, including but not limited to APIs, one or more web services, one or more content sources, one or more networks, or any other suitable components, e.g., that servers may communicate with. A third-party system 908 may be operated by a different entity from an entity operating social-networking system 902. In particular embodiments, however, social-networking system 902 and third-party systems 908 may operate in conjunction with each other to provide social-networking services to users of social-networking system 902 or third-party systems 908. In this sense, social-networking system 902 may provide a platform, or backbone, which other systems, such as third-party systems 908, may use to provide social-networking services and functionality to users across the Internet.

In particular embodiments, a third-party system 908 may include a third-party content object provider. A third-party content object provider may include one or more sources of content objects, which may be communicated to a client system 906. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 902 also includes user-generated content objects, which may enhance a user's interactions with social-networking system 902. User-generated content may include anything a user can add, upload, send, or "post" to social-networking system 902. As an example and not by way of limitation, a user communicates posts to social-networking system 902 from a client system 906. Posts may include data such as status updates or other textual data, location information, photos, videos, links, music or other similar data or media. Content may also be added to social-networking system 902 by a third-party through a "communication channel," such as a newsfeed or stream.

In particular embodiments, social-networking system 902 may include a variety of servers, sub-systems, programs, modules, logs, and data stores. In particular embodiments, social-networking system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 902 may also include suitable components such as network interfaces, security mechanisms, load balancers, failover servers, management-and-network-operations consoles, other suitable components, or any suitable combination thereof. In particular embodiments, social-networking system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 902 to one or more client systems 906 or one or more third-party system 908 via network 904. The web server may include a mail server or other messaging functionality for receiving and routing messages between social-networking system 902 and one or more client systems 906. An API-request server may allow a third-party system 908 to access information from social-networking system 902 by calling one or more APIs. An action logger may be used to receive communications from a web server about a user's actions on or off social-networking system 902. In conjunction with the action log, a third-party-content-object log may be maintained of user exposures to third-party-content objects. A notification controller may provide information regarding content objects to a client system 906. Information may be pushed to a client system 906 as notifications, or information may be pulled from client system 906 responsive to a request received from client system 906. Authorization servers may be used to enforce one or more privacy settings of the users of social-networking system 902. A privacy setting of a user determines how particular information associated with a user can be shared. The authorization server may allow users to opt in to or opt out of having their actions logged by social-networking system 902 or shared with other systems (e.g., third-party system 908), such as, for example, by setting appropriate privacy settings. Third-party-content-object stores may be used to store content objects received from third parties, such as a third-party system 908. Location stores may be used for storing location information received from client systems 906 associated with users. Advertisement-pricing modules may combine social information, the current time, location information, or other suitable information to provide relevant advertisements, in the form of notifications, to a user.

Figure 10:
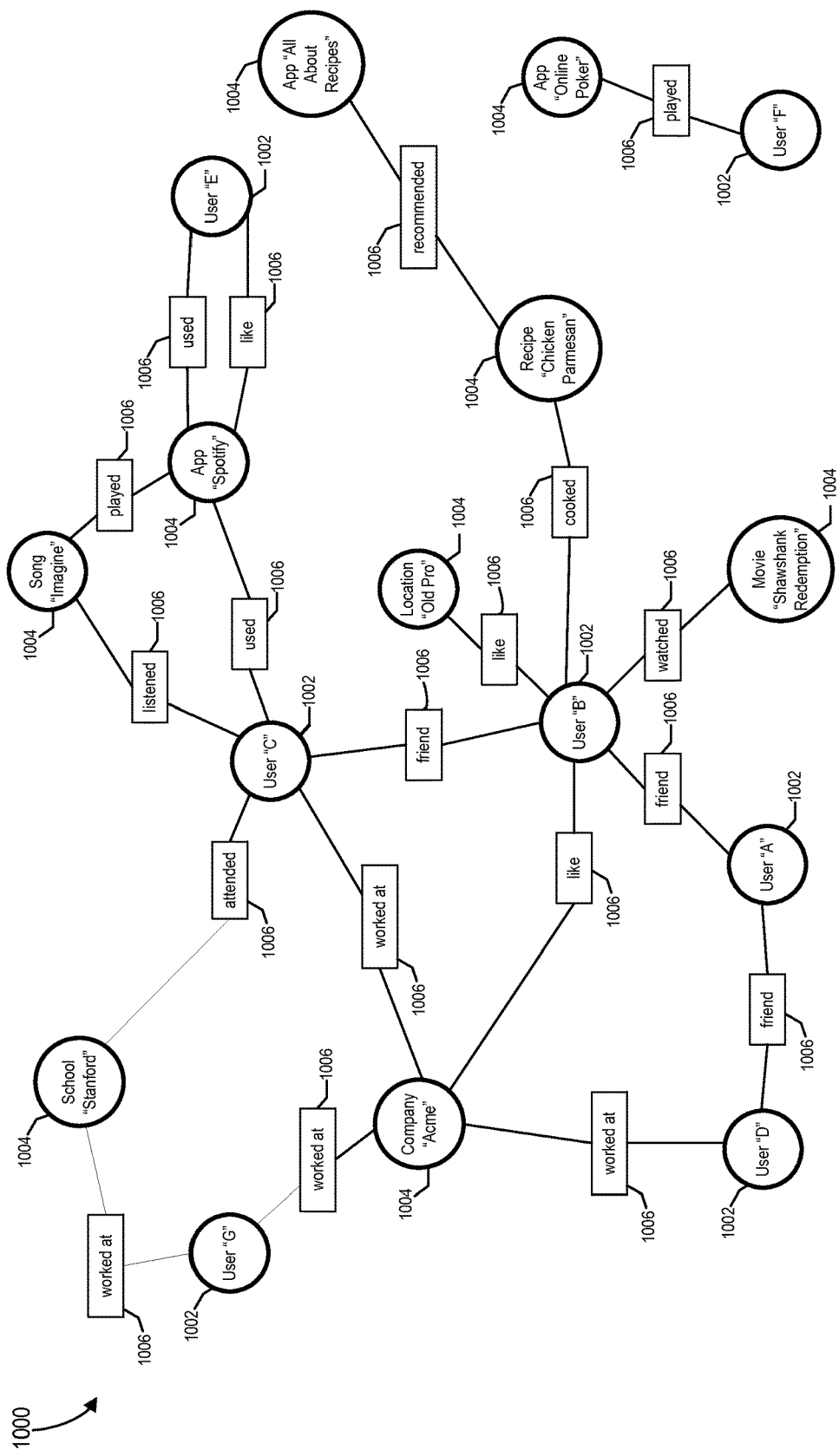
FIG. 10 illustrates a social graph in accordance with one or more embodiments.

FIG. 10 illustrates example social graph 1000. In particular embodiments, social-networking system 902 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social-networking system 902, client system 906, or third-party system 908 may access social graph 1000 and related social-graph information for suitable applications. The nodes and edges of social graph 1000 may be stored as data objects, for example, in a data store (such as a social-graph database). Such a data store may include one or more searchable or query able indexes of nodes or edges of social graph 1000.

In particular embodiments, a user node 1002 may correspond to a user of social-networking system 902. As an example and not by way of limitation, a user may be an individual (human user), an entity (e.g., an enterprise, business, or third-party application), or a group (e.g., of individuals or entities) that interacts or communicates with or over social-networking system 902. In particular embodiments, when a user registers for an account with social-networking system 902, social-networking system 902 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with social-networking system 902. In particular embodiments, a user node 1002 may be associated with information provided by a user or information gathered by various systems, including social-networking system 902. As an example and not by way of limitation, a user may provide his or her name, profile picture, contact information, birth date, sex, marital status, family status, employment, education background, preferences, interests, or other demographic information. In particular embodiments, a user node 1002 may be associated with one or more data objects corresponding to information associated with a user. In particular embodiments, a user node 1002 may correspond to one or more webpages.

In particular embodiments, a concept node 1004 may correspond to a concept. As an example and not by way of limitation, a concept may correspond to a place (such as, for example, a movie theater, restaurant, landmark, or city); a website (such as, for example, a website associated with social-network system 902 or a third-party website associated with a web-application server); an entity (such as, for example, a person, business, group, sports team, or celebrity); a resource (such as, for example, an audio file, video file, digital photo, text file, structured document, or application) which may be located within social-networking system 902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including social-networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social-networking system 902. Profile pages may also be hosted on third-party websites associated with a third-party server 908. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 906 to send to social-networking system 902 a message indicating the user's action. In response to the message, social-networking system 902 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social-networking system 902 may send a "friend request" to the second user. If the second user confirms the "friend request," social-networking system 902 may create an edge 1006 connecting the first user's user node 1002 to the second user's user node 1002 in social graph 1000 and store edge 1006 as social-graph information in one or more of data stores. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to a edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social-networking system 902 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 902 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social-networking system 902 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social-networking system 902 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 906) may indicate that he or she likes the concept represented by the concept node 1004 by clicking or selecting a "Like" icon, which may cause the user's client system 906 to send to social-networking system 902 a message indicating the user's liking of the concept associated with the concept-profile page. In response to the message, social-networking system 902 may create an edge 1006 between user node 1002 associated with the user and concept node 1004, as illustrated by "like" edge 1006 between the user and concept node 1004. In particular embodiments, social-networking system 902 may store an edge 1006 in one or more data stores. In particular embodiments, an edge 1006 may be automatically formed by social-networking system 902 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 902) or RSVP (e.g., through social-networking system 902) to an event associated with the advertisement. In addition or as an alternative, an advertisement may include social-networking-system context directed to the user. As an example and not by way of limitation, an advertisement may display information about a friend of the user within social-networking system 902 who has taken an action associated with the subject matter of the advertisement.

In particular embodiments, social-networking system 902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 902 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 902 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 902 may calculate a coefficient based on a user's actions. Social-networking system 902 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 902 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Social-networking system 902 may analyze a user's actions to determine whether one or more of the actions indicate an affinity for subject matter, content, other users, and so forth. As an example and not by way of limitation, if a user may make frequently posts content related to "coffee" or variants thereof, social-networking system 902 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 902 may calculate a coefficient based on the type of relationship between particular objects. Referencing the social graph 1000, social-networking system 902 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than a user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 902 may determine that the user has a higher coefficient with respect to the first photo than the second photo because having a tagged-in-type relationship with content may be assigned a higher weight and/or rating than having a like-type relationship with content. In particular embodiments, social-networking system 902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 902 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social-networking system 902 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 906 of the user). A first user may be more interested in other users or concepts that are closer to the first user. As an example and not by way of limitation, if a user is one mile from an airport and two miles from a gas station, social-networking system 902 may determine that the user has a higher coefficient for the airport than the gas station based on the proximity of the airport to the user.

In particular embodiments, social-networking system 902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 902 may provide information that is relevant to user's interests and current circumstances, increasing the likelihood that they will find such information of interest. In particular embodiments, social-networking system 902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 908 (e.g., via an API or other communication channel), or from another suitable system. In response to the request, social-networking system 902 may calculate the coefficient (or access the coefficient information if it has previously been calculated and stored). In particular embodiments, social-networking system 902 may measure an affinity with respect to a particular process. Different processes (both internal and external to the online social network) may request a coefficient for a particular object or set of objects. Social-networking system 902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by social-networking system 902 or shared with other systems (e.g., third-party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 902 may send a request to the data store for the object. The request may identify the user associated with the request and may only be sent to the user (or a client system 906 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
    identifying, by at least one processor and based on previous social networking activities of the sender, social networking information associated with the sender;
    identifying, by the at least one processor and based on previous social networking activities of a recipient of the electronic message, social networking information associated with the recipient; and
    determining, by the at least one processor and based on an analysis of the social networking information associated with the sender and the social networking information associated with the recipient, whether to generate a generate a second version of the electronic message in a second language for the recipient.

2. The method as recited in claim 1, further comprising identifying the previous social networking activities of the recipient.

3. The method as recited in claim 2, wherein identifying the previous social networking activities of the recipient further comprises one or more of identifying one or more electronic message interactions performed by the recipient, identifying one or more locations associated with the recipient, identifying one or more social network transactions performed by the recipient, identifying one or more connections of the recipient, identifying recipient-provided profile information, or identifying one or more translation ratings provided by the recipient.

4. The method as recited in claim 3, wherein identifying one or more electronic message interactions performed by the recipient comprises identifying one or more electronic messages commented on by the recipient, electronic messages liked by the recipient, comments made by the recipient, or electronic messages shared by the recipient.

5. The method as recited in claim 3, wherein identifying one or more locations associated with the recipient comprises identifying one or more of a current location associated with the recipient, a location where the recipient is from, a location where the recipient has checked-in, a location where the recipient has traveled, a location where the recipient works, one or more locations where the recipient has lived, or a location associated with where the recipient was educated.

6. The method as recited in claim 3, wherein identifying one or more social network transactions performed by the recipient comprises identifying one or more of a purchase made by the recipient via a social networking system, a purchase made by the recipient announced via the social networking system, a currency associated with a purchase made by the recipient via the social networking system, a product recommended by the recipient via the social networking system, or a point of origin for a product purchased by the recipient via the social networking system.

7. The method as recited in claim 3, wherein determining, based on an analysis of the social networking information associated with the sender and the social networking information associated with the recipient, whether to generate the second version of the electronic message in the second language for the recipient comprises:
    identifying a predominant language indicated by the previous social networking activities of the recipient;
    determining whether the second language is the same language as the predominant language;
    if the second language is the same language as the predominant language, determining to generate, for the recipient, the second version of the electronic message; and if the second language is not the same language as the predominant language, determining to provide, to the recipient, the first version of the electronic message.

8. The method as recited in claim 1, further comprising:
identifying one or more social network profile settings associated with the recipient; and
wherein determining whether to generate the second version of the electronic message in the second language for the recipient is further based on the identified one or more social network profile settings associated with the recipient.

9. The method as recited in claim 8, wherein identifying one or more social network profile settings associated with the recipient comprises identifying one or more of a preferred language of the recipient, or a location setting of the recipient.

10. The method as recited in claim 1, further comprising:
identifying social networking information associated with one or more friends of the recipient, wherein the social networking information associated with the one or more friends of the recipient comprises one or more of a location associated with the one or more friends of the recipient, or a preferred language associated with the one or more friends of the recipient; and
wherein determining whether to generate the second version of the electronic message in the second language for the recipient is further based on the identified social networking information associated with the one or more friends of the recipient.

11. A non-transitory computer-readable storage medium storing instructions thereon that, when executed by at least one processor, cause a system to:
receive a first version of an electronic message, wherein the first version of the electronic message is in a first language;
identify, based on previous social networking activities of a sender, social networking information associated with the sender;
identify a recipient of the electronic message;
identify, based on previous social networking activities of a recipient of the electronic message, social networking information associated with the recipient; and
determine, based on an analysis of the social networking information associated with the sender and the social networking information associated with the recipient, whether to generate a second version of the electronic message in a second language for identified recipient.

12. The non-transitory computer-readable storage medium as recited in claim 11, wherein identifying a recipient of the electronic message comprises identifying a co-user associated with a sender of the first version of the electronic message via a social networking system.

13. The non-transitory computer-readable storage medium as recited in claim 12, wherein identifying, based on previous social networking activities of the recipient, social networking information associated with the recipient comprises identifying one or more of electronic messages commented on by the recipient, electronic messages liked by the recipient, comments made by the recipient, electronic messages shared by the recipient, a current location associated with the recipient, a location where the recipient came from, a location where the recipient has checked-in, a location where the recipient has traveled to, a purchase made by the recipient via a social network, connections of the recipient, profile information, or implicit information related to the recipient.

14. The non-transitory computer-readable storage medium as recited in claim 13, further comprising identifying a language indicated by the social networking information associated with the recipient.

15. The non-transitory computer-readable storage medium as recited in claim 14, wherein determining, based on the analysis of the social networking information associated with the sender and the social networking information associated with the recipient, whether generate the second version of the electronic message to in the second language for the identified recipient comprises:
identifying a predominant language for one or more identified social networking activities of the recipient;
determining whether the second language is the same language as the predominant language;
if the second language is the same language as the predominant language, determining to generate, for the recipient, the second version of the electronic message; and
if the second language is not the same language as the predominant language, determining to provide, to the recipient, the first version of the electronic message.

16. The non-transitory computer-readable storage medium as recited in claim 15, further comprising:
identifying one or more translation ratings associated with the sender; and
wherein determining whether to generate the second version of the electronic message in the second language for the identified recipient is further based on the one or more translation ratings.

17. The non-transitory computer-readable storage medium as recited in claim 16, further comprising:
assigning a weight to each of one or more social networking activities associated with the recipient; and
wherein determining whether to generate the second version of the electronic message in the second language for the identified recipient is further based on the assigned weights.

18. The non-transitory computer-readable storage medium as recited in claim 17, further storing instruction that, when executed by the at least one processor, cause a system to generate the second version of the electronic message in the second language based on the determination.

19. A system comprising:
at least one processor; and
at least one non-transitory computer-readable storage medium storing instructions thereon that, when executed by the at least one processor, cause the system to:
receive, from a sender, a first version of an electronic message, wherein the first version of the electronic message is in a first language;
identify, based on previous social networking activities of the sender, social networking information associated with the sender;
identify, based on previous social networking activities of a recipient of the electronic message, social networking information associated with the recipient; and
determine, based on an analysis of the social networking information associated with the sender and the social networking information associated with the recipient, whether to generate a second version of the electronic message is in a second language for the recipient.

20. The system as recited in claim 19, wherein the instructions when executed by the at least one processor, further cause the system to generate the second version of the electronic message using a machine translator based on the determination.

* * * * *